(12) United States Patent
Kramer et al.

(10) Patent No.: US 8,958,679 B2
(45) Date of Patent: Feb. 17, 2015

(54) FIBRE-OPTIC TELECOMMUNICATIONS MODULE

(75) Inventors: Anne Kramer, Berlin (DE); Bartolomej Krupansky, Brno (CZ)

(73) Assignee: Tyco Electronics Services GmbH, Schaffhausen (CH)

( * ) Notice: Subject to any disclaimer, the term of this patent is extended or adjusted under 35 U.S.C. 154(b) by 85 days.

(21) Appl. No.: 13/582,000

(22) PCT Filed: Jan. 10, 2011

(86) PCT No.: PCT/EP2011/000051
§ 371 (c)(1),
(2), (4) Date: Aug. 30, 2012

(87) PCT Pub. No.: WO2011/107180
PCT Pub. Date: Sep. 9, 2011

(65) Prior Publication Data
US 2012/0321269 A1 Dec. 20, 2012

Related U.S. Application Data

(60) Provisional application No. 61/309,746, filed on Mar. 2, 2010.

(51) Int. Cl.
*G02B 6/00* (2006.01)
*G02B 6/44* (2006.01)
*G02B 6/38* (2006.01)

(52) U.S. Cl.
CPC ............ *G02B 6/4452* (2013.01); *G02B 6/3825* (2013.01); *G02B 6/4455* (2013.01)
USPC ...................................... 385/135

(58) Field of Classification Search
USPC ...................................... 385/135
See application file for complete search history.

(56) References Cited

U.S. PATENT DOCUMENTS 4,359,262 A    11/1982 Dolan
(Continued)

FOREIGN PATENT DOCUMENTS

AU    40995/85    4/1985
(Continued)

OTHER PUBLICATIONS

International Search Report for International Application No. PCT/EP2011/000051 mailed Apr. 18, 2011.
(Continued)

*Primary Examiner* — Mike Stahl
*Assistant Examiner* — Kajli Prince
(74) *Attorney, Agent, or Firm* — Merchant & Gould P.C.

(57) ABSTRACT

The invention relates to a fiber optic telecommunications module (100) comprising: a main housing portion (102) including a top wall (108), a bottom wall (110), a first transverse sidewall (106), a rear wall (112), an open front end (120), and an open second side (116), the main housing portion (102) including an optical component (130); a cover portion (104, 104a) coupled to the main housing portion (102) to close up the open second side (116) of the main housing portion (102) and keep the optical component (130) within the main housing portion (102); a first fiber optic adapter module (316) and a second fiber optic adapter module (316) removably coupled to the main housing portion (102) to close the open front end (120) of the main housing portion (102), the first and second fiber optic adapter modules (316) being provided in a stacked arrangement in a direction extending from the first transverse (106) sidewall toward the cover portion (104, 104a); wherein each of the first and second fiber optic adapter modules includes a plurality of fiber optic adapters (340) which are configured to receive connectorized cables extending from the optical component (130) within the main housing portion (102), each adapter (340) defining a longitudinal axis ($A_A$) that is parallel to the top and bottom walls (108, 110) of the main housing portion (102), each of the first and second fiber optic adapter modules (316) including at least one guide rail (508) extending between the top wall (108) and the bottom wall (110) of the main housing portion (102), the guide rail (508) being configured for slidably mounting the fiber optic telecommunications module (100) to a first telecommunications device, wherein the guide rail (508) is configured for sliding the fiber optic telecommunications module (100) along a direction that is non-parallel to the longitudinal axes ($A_A$) of the adapters (340) and to a fiber optic assembly and a method of mounting a telecommunications module (100) to a piece of telecommunications equipment.

17 Claims, 17 Drawing Sheets

(56) References Cited

U.S. PATENT DOCUMENTS

| | | |
|---|---|---|
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,699,455 A | 10/1987 | Erbe et al. |
| 4,708,430 A | 11/1987 | Donaldson et al. |
| 4,717,231 A | 1/1988 | Dewez et al. |
| 4,736,100 A | 4/1988 | Vastagh |
| 4,747,020 A | 5/1988 | Brickley et al. |
| 4,765,710 A | 8/1988 | Burmeister et al. |
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,948,220 A | 8/1990 | Violo et al. |
| 4,971,421 A | 11/1990 | Ori |
| 4,986,762 A | 1/1991 | Keith |
| 4,995,688 A | 2/1991 | Anton et al. |
| 5,023,646 A | 6/1991 | Ishida et al. |
| 5,058,983 A | 10/1991 | Corke et al. |
| 5,067,784 A | 11/1991 | Debortoli et al. |
| 5,071,211 A | 12/1991 | Debortoli et al. |
| 5,073,042 A | 12/1991 | Mulholland et al. |
| 5,076,688 A | 12/1991 | Bowen et al. |
| 5,100,221 A | 3/1992 | Carney et al. |
| 5,129,030 A | 7/1992 | Petrunia |
| 5,138,688 A | 8/1992 | Debortoli |
| 5,142,598 A | 8/1992 | Tabone |
| 5,142,606 A | 8/1992 | Carney et al. |
| 5,160,188 A | 11/1992 | Rorke et al. |
| 5,167,001 A | 11/1992 | Debortoli et al. |
| 5,179,618 A | 1/1993 | Anton |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,289,558 A | 2/1994 | Teichler et al. |
| 5,317,663 A | 5/1994 | Beard et al. |
| 5,318,259 A | 6/1994 | Fussler |
| 5,333,221 A | 7/1994 | Briggs et al. |
| 5,333,222 A | 7/1994 | Belenkiy et al. |
| 5,335,349 A | 8/1994 | Kutsch et al. |
| 5,353,367 A | 10/1994 | Czosnowski et al. |
| 5,359,688 A | 10/1994 | Underwood |
| 5,363,440 A | 11/1994 | Daoud |
| 5,363,465 A | 11/1994 | Korkowski et al. |
| 5,363,467 A | 11/1994 | Keith |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,420,958 A | 5/1995 | Henson et al. |
| 5,432,875 A | 7/1995 | Korkowski et al. |
| 5,442,726 A | 8/1995 | Howard et al. |
| 5,448,015 A | 9/1995 | Jamet et al. |
| 5,469,526 A | 11/1995 | Rawlings |
| 5,490,229 A | 2/1996 | Ghandeharizadeh et al. |
| 5,497,444 A | 3/1996 | Wheeler |
| 5,511,144 A | 4/1996 | Hawkins et al. |
| 5,542,015 A | 7/1996 | Hultermans |
| 5,570,450 A | 10/1996 | Fernandez et al. |
| 5,636,138 A | 6/1997 | Gilbert et al. |
| 5,647,043 A | 7/1997 | Anderson et al. |
| 5,689,604 A | 11/1997 | Janus et al. |
| 5,708,751 A | 1/1998 | Mattei |
| 5,715,348 A | 2/1998 | Falkenberg et al. |
| 5,717,810 A | 2/1998 | Wheeler |
| 5,734,776 A | 3/1998 | Puetz |
| 5,758,002 A | 5/1998 | Walters |
| 5,758,003 A | 5/1998 | Wheeler et al. |
| 5,764,844 A | 6/1998 | Mendes |
| 5,774,245 A | 6/1998 | Baker |
| 5,774,612 A | 6/1998 | Belenkiy et al. |
| 5,781,686 A | 7/1998 | Robinson et al. |
| 5,784,515 A | 7/1998 | Tamaru et al. |
| 5,823,646 A | 10/1998 | Arizpe et al. |
| 5,825,955 A | 10/1998 | Ernst et al. |
| 5,883,995 A | 3/1999 | Lu |
| 5,887,095 A | 3/1999 | Nagase et al. |
| 5,903,698 A | 5/1999 | Poremba et al. |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,966,492 A | 10/1999 | Bechamps et al. |
| 5,969,294 A | 10/1999 | Eberle et al. |
| 5,987,203 A | 11/1999 | Abel et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,097,872 A | 8/2000 | Kusuda et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,360,050 B1 | 3/2002 | Moua et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,504,988 B1 | 1/2003 | Trebesch et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,577,595 B1 | 6/2003 | Counterman |
| 6,591,051 B2 | 7/2003 | Solheid |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,654,536 B2 | 11/2003 | Battey et al. |
| 6,661,961 B1 | 12/2003 | Allen et al. |
| 6,668,127 B1 | 12/2003 | Mahony |
| 6,688,780 B2 | 2/2004 | Duran |
| 6,711,339 B2 | 3/2004 | Puetz et al. |
| 6,755,574 B2 | 6/2004 | Fujiwara et al. |
| 6,760,530 B1 | 7/2004 | Mandry |
| 6,760,531 B1 | 7/2004 | Solheid |
| 6,764,221 B1 | 7/2004 | Jong et al. |
| 6,778,752 B2 | 8/2004 | Laporte et al. |

(56) References Cited

U.S. PATENT DOCUMENTS

| | | |
|---|---|---|
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,793,517 B2 | 9/2004 | Neer et al. |
| 6,815,612 B2 | 11/2004 | Bloodworth et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,920,213 B2 | 7/2005 | Pershan |
| 6,920,274 B2 | 7/2005 | Rapp et al. |
| 6,925,241 B2 | 8/2005 | Bohle et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,066,762 B2 | 6/2006 | Neer et al. |
| 7,079,744 B2 | 7/2006 | Douglas et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,102,884 B2 | 9/2006 | Mertesdorf et al. |
| 7,103,255 B2 | 9/2006 | Reagan et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,330,546 B2 | 2/2008 | Kessler et al. |
| 7,333,707 B2 | 2/2008 | Puetz et al. |
| 7,346,254 B2 | 3/2008 | Kramer et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,400,813 B2 | 7/2008 | Zimmel |
| 7,400,816 B2 | 7/2008 | Reagan et al. |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,457,503 B2 | 11/2008 | Solheid et al. |
| 7,471,869 B2 | 12/2008 | Reagan et al. |
| 7,515,805 B2 | 4/2009 | Vongseng et al. |
| 7,519,259 B2 | 4/2009 | Smith et al. |
| 7,555,193 B2 | 6/2009 | Rapp et al. |
| 7,623,749 B2 | 11/2009 | Reagan et al. |
| 7,646,958 B1 | 1/2010 | Reagan et al. |
| RE41,460 E | 7/2010 | Wheeler |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,873,255 B2 | 1/2011 | Reagan et al. |
| 7,983,521 B2 | 7/2011 | Rapp et al. |
| 8,019,192 B2 | 9/2011 | Puetz et al. |
| 8,139,913 B2 | 3/2012 | Bolster et al. |
| 8,358,900 B2 | 1/2013 | Rapp et al. |
| 8,417,074 B2 | 4/2013 | Nhep et al. |
| 2002/0181893 A1 | 12/2002 | White et al. |
| 2003/0007767 A1 | 1/2003 | Douglas et al. |
| 2003/0095772 A1 | 5/2003 | Solheid et al. |
| 2004/0109660 A1 | 6/2004 | Liberty |
| 2005/0003697 A1 | 1/2005 | Neer et al. |
| 2009/0245743 A1* | 10/2009 | Cote et al. ............ 385/135 |
| 2009/0252577 A1 | 10/2009 | Redmann et al. |
| 2010/0129028 A1 | 5/2010 | Nhep et al. |

FOREIGN PATENT DOCUMENTS

| | | |
|---|---|---|
| AU | 55314/86 | 3/1986 |
| CN | 2426610 Y | 4/2001 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 1144266 S | 6/2002 |
| JP | 3307618 B2 | 7/2002 |
| JP | 3761762 B2 | 3/2006 |
| WO | 91/10927 | 7/1991 |
| WO | 95/20175 | 7/1995 |
| WO | 98/53347 | 11/1998 |
| WO | 99/27404 | 6/1999 |
| WO | 00/05611 | 2/2000 |
| WO | 00/07053 | 2/2000 |
| WO | 00/52504 | 9/2000 |
| WO | 00/75706 | 12/2000 |
| WO | 02/21182 | 3/2002 |
| WO | 02/103429 | 12/2002 |
| WO | 03/093883 A2 | 11/2003 |
| WO | WO 2008/089192 | 7/2008 |
| WO | WO 2009/120280 | 10/2009 |

OTHER PUBLICATIONS

"ADC OMX 600 Optical Distribution Frame Solution," *ADC Telecommunications, Inc.*, Publication No. 856, 8 pages (Feb. 2000).

"OMX™ 600 Optical Distribution Frame," *ADC Telecommunications, Inc.*, Publication No. 854, front cover, table of contents, pp. 1-13 (Apr. 2000) (15 pages total).

"Optical fiber coupler review," Manufacturing Group at the Optoelectronics Division, Technical Report 2001, Products Presentation, showing Sumitomo Osaka Cement Co. Ltd's Optical Coupler (pp. 41-42).

(56) References Cited

OTHER PUBLICATIONS 21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
ADC Telecommunications, Inc. brochure entitled "FL2000 Products," Publication No. 803, 51 pages (Nov. 1996).
ADC Telecommunications, Inc., "6$^{th}$ Edition of Next Generation Frame (NGF) Product Family Ordering Guide," front cover, Table of Contents, pp. 1-41, and back cover, Publication No. 820 (revised Feb. 2003) (44 pages total).
ADC Telecommunications, Inc., "Mini VAM Connector Cleaning Instructions," ADCP-90-412, Issue 3, 8 pages (Sep. 2002).
ADC Telecommunications, Inc., "Next Generation Frame (NGF) Product Tour," Value Added Modules (VAMs), Copyright 2003, 1 page, (admitted as offered for sale as of Apr. 25, 2006).
ADC Telecommunications, Inc., 600 mm Products, Value-Added Module System, pp. 53-78 (Oct. 2003) (26 pages total).
ADC Telecommunications, Inc., brochure entitled "Fiber Cable Management Products, Second Edition," Publication No. 804, 144 pages (Oct. 1995).
ADC Telecommunications, Inc., brochure entitled "Next Generation Frame (NGF) Product Family Ordering Guide," Publication No. 820, 22 pages (Oct. 1998).
ADC Telecommunications, Inc., brochure entitled "Fiber Management Tray: 2 Rack Unit (2 RU) Style FMT-G Series," Publication No. 1258896, 8 pages (Mar. 2003).
ADC Telecommunications, Inc., brochure entitled "Fiber Optic Cable Assemblies and Accessories," front cover, Table of Contents, pp. 1-23, and back cover, Item No. 100300 (revised Apr. 2003) (26 pages total).
ADC Telecommunications, Inc., brochure entitled "Fiber Panel Products, Second Edition," front cover, Table of Contents, and pp. 1-111, Publication No. 846 (Jul. 1996) (116 pages total).
ADC Telecommunications, Inc., brochure entitled "Outside Plant, Fiber Cross-Connect Solutions," front cover, Table of Contents, pp. 1-48, and back cover, Item No. 1047 (Jun. 2002).
ADC Telecommunications, Inc., brochure entitled "Secure Fiber Entrance Terminal (SFET), " front cover, pp. 2-7, and back cover, Item No. 1005 (revised May 1998) (8 pages total).
ADC Telecommunications, Inc., brochure entitled "Value-Added Module System," Publication No. 891, 29 pages (Apr. 2000).
ADC Telecommunications, Inc., brochure entitled "Value-Added Module System: Optical Distribution Frame (OMX™ 600)," Publication No. 891-OMX, 11 pages (Jan. 2002).
ADC Telecommunications, Inc., brochure entitled "Value-Added Module (VAM) System: Monitor, Splitter, WDM and CWDM Modules and Chassis for Switching Office, Central Exchange and Headend Applications, 1$^{st}$ edition," Part No. 101663BE, 36 pages (Feb. 2008).
ADC Telecommunications, Inc., FMT Micro Value Added Monitor Module Configuration Scheme, 2 pages (Feb. 6, 2003).
ADC Telecommunications, Inc., Mini VAM Splitter Mod (Installation Drawing), Drawing No. 1128185, 2 pages (Mar. 14, 2001).
ADC Telecommunications, Inc., Next Generation Frame (NGF) Product Family, Publication No. 832, 8 pages, (Dec. 2000).
Alcoa Fujikura Ltd., brochure entitled "Couplers: Couplers WDMS Packaging,", 5 pages (copyright 2000).
AMP Inc. catalog entitled "Fiber Optic Products," front and back covers and p. 59, (© 1991) (4 pages total).
Amphenol Corp., brochure entitled "Amphenol® 954 Series one piece SC Connector," F122-00311, Issue 1, 2 pages (Aug. 1990).
Assembly reference drawings having drawing No. 1067101, 8 pages (Aug. 17, 1999).
AT&T Network Systems, catalog entitled "Fiber Optic Products Innovation for wide ranging applications," front and back covers and pp. 6-1 through 6-16 (Feb. 1995) (18 pages total).
AT&T Network Systems, Product Bulletin, "High Density Interconnect System (HDIC)," 2987D-DLH-7/89, Issue 2, 4 pages (Copyright 1989).
ATI Optique Catalog, ATI Optique, division of ATI Electronique, Version 2.6, released Mar. 27, 2002 (50 pages).
Connectorized splitter drawings having drawing No. 1067961, 2 pages (Aug. 18, 1999).
Corning Cable Systems, "Installation Instructions for 12-position Splice Protector Insert," SRP-001-276, Issue 4, 1 page (Jul. 2001).
Corning Cable Systems, "Jumper Routing Procedure for Enhanced Management Frame," SRP-003-599, Issue 2, 4 pages (Apr. 2002).
Fiber distribution drawings having drawing No. 1069967, 2 pages (Aug. 17, 1999).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (Nov. 2004).
Hasegawa et al., *100GHZ-48CH Athermal AWG with a Novel Temperature Insensitive Principle*, National Fiber Optics Engineers Conference, 2003 Technical Proceedings, pp. 801-808.
Hirose Electric Co., Ltd., catalog entitled "Optical Fibre Connectors," Catalog No. O.F. (9) 3K, front and back covers and pp. 16, 17 and 49 (Mar. 1991) (5 pages total).
Installation drawings having drawing No. 1069965, 3 pages (Aug. 14, 1999).
International Search Report and Written Opinion for Application No. PCT/US2009/064785, mailed Feb. 26, 2010, 16 pages.
Iwano et al., "MU-type Optical Fiber Connector System," *NTT Review*, vol. 9, No. 2, pp. 63-71 (Mar. 1997).
Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International, brochure entitled "Fiber Termination Module (FTM) & Premises Optical Distribution Cabinets (PODC)," 3 pages, undated.
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Sugita et al., "SC-Type Single-Mode Optical Fiber Connectors," *Journal of Lightwave Technology*, vol. 7, No. 11, pp. 1689-1696 (Nov. 1989).
Tachikura et al., "Newly Developed Optical Fiber Distribution System and Cable Management in Central Office," International Wire & Cable Symposium, Proceedings of the 50$^{th}$ IWCS, pp. 98-105, undated.

* cited by examiner

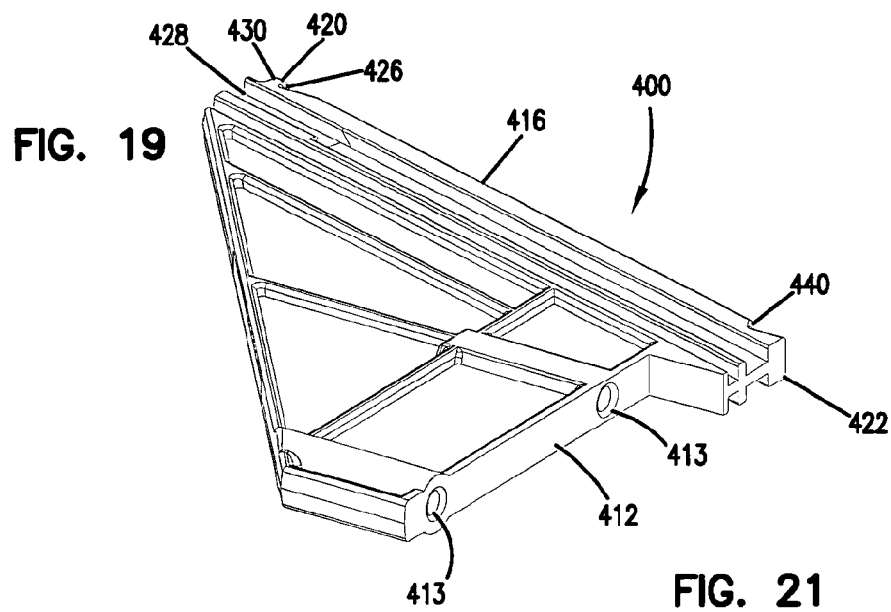
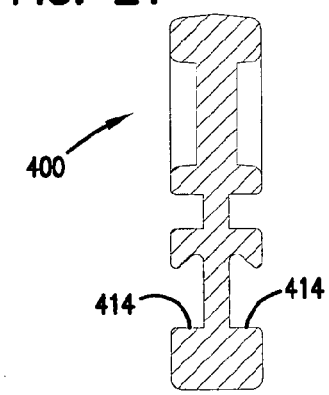
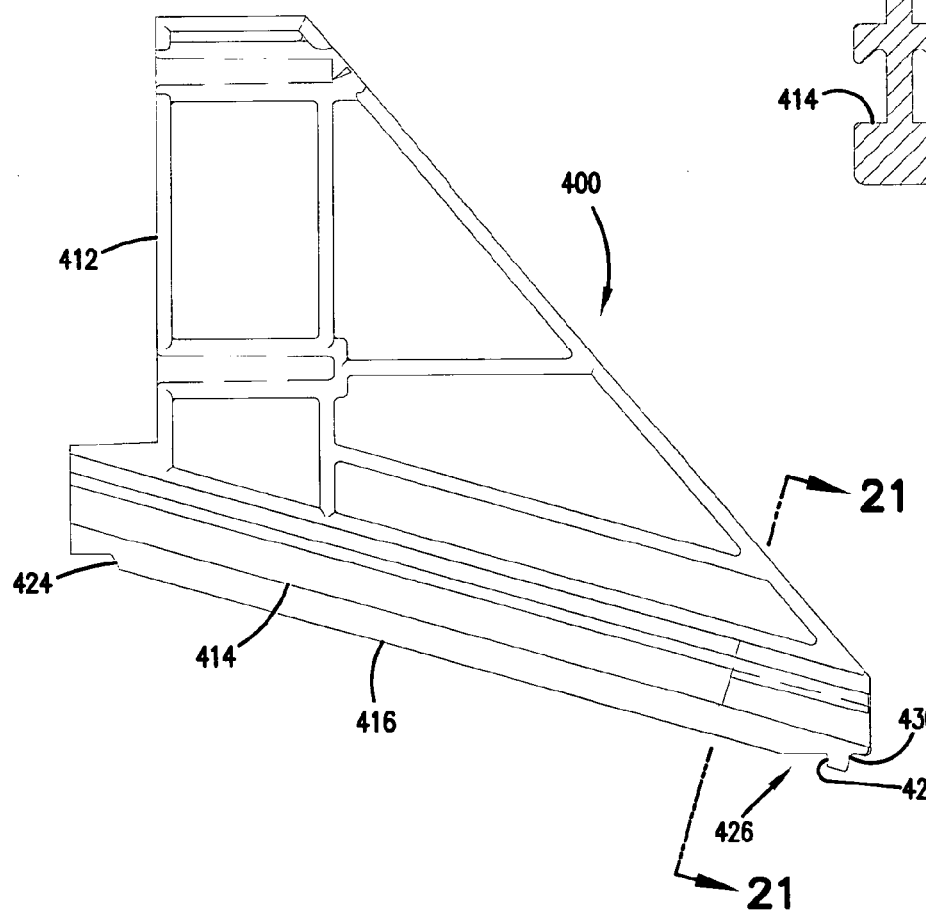

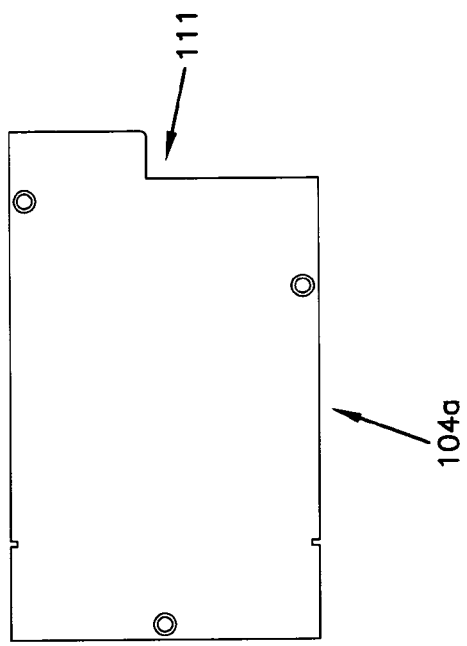
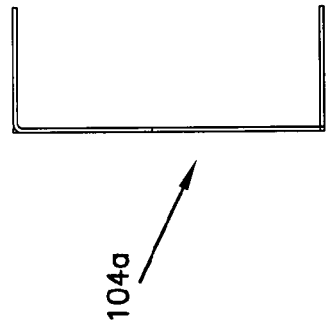
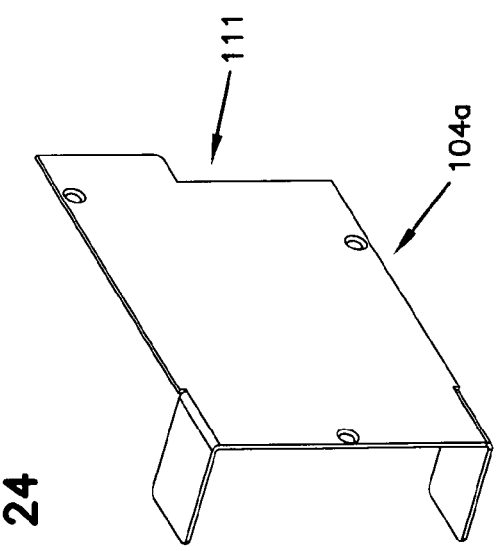
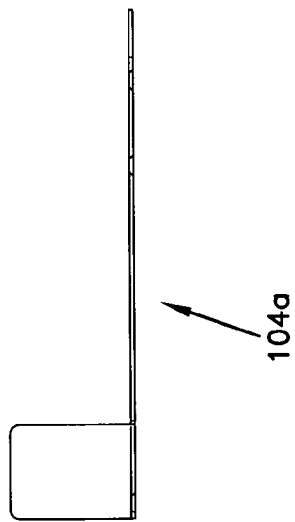

FIBRE-OPTIC TELECOMMUNICATIONS MODULE

This application is a National Stage Application of PCT/EP2011/000051, filed 10 Jan. 2011, which claims benefit of U.S. Ser. No. 61/309,746, filed 2 Mar. 2010 and which applications are incorporated herein by reference. To the extent appropriate, a claim of priority is made to each of the above disclosed applications.

FIELD

The present disclosure relates to a fiber optic telecommunications module, a fiber optic assembly and a method of mounting a telecommunications module to a piece of telecommunications equipment.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters or multiplexers may be used to provide the connection between transmission fibers and customer fibers. To reduce the cost and complexity of the initial installation and still provide options for future expansion, a module mounting panel capable of mounting multiple modules may be used in such an installation.

These panels may be configured with limited access to one or more sides, or may be mounted in cramped locations. In addition, some of these panels may be pre-configured with the maximum capacity of transmission cables to accommodate and link to modules which may be installed in the future. Since it is desirable to have access to components within the panel, some provision or feature of the panel may desirably permit a user to access the connectors of these pre-connectorized and pre-installed transmission cables.

While the demand for added capacity in telecommunications is growing rapidly, this demand is being met in part by increasing the density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Further improvements in adding fiber optic capacity and increasing density while achieving accessibility are desired.

The invention is based on the technical problem of providing a fiber optic telecommunications module, a fiber optic assembly having a plurality of fiber optic telecommunications modules and also a method for mounting a telecommunications module to a piece of telecommunications equipment which achieves the addition of fiber optic capacity where the density is increased so as to attain accessibility.

The technical problem is solved by the subject matter having the features of claims 1, 12 and 17. Further advantageous refinements of the invention can be found in the subclaims.

SUMMARY

The present invention relates to a fiber optic telecommunications module. The telecommunications module is a module including a plurality of adapters mounted thereon and at least one optical component within the module.

According to one inventive aspect, the module includes a main housing portion including a top wall, a bottom wall, a first transverse sidewall, a rear wall, an open front end, and an open second side, the main housing portion including an optical component therewithin. A cover portion is coupled to the main housing portion to close up the open second side of the main housing portion and keep the optical component within the main housing portion. A first fiber optic adapter module and a second fiber optic adapter module are removably coupled to the main housing portion to close the open front end of the main housing portion, the first and second fiber optic adapter modules being provided in a stacked arrangement in a direction extending from the first transverse sidewall toward the cover portion. Each of the first and second fiber optic adapter modules includes a plurality of fiber optic adapters configured to receive connectorized cables extending from the optical component within the main housing portion, each adapter defining a longitudinal axis that is parallel to the top and bottom walls of the main housing portion. Each of the first and second fiber optic adapter modules includes at least one guide rail extending generally between the top wall and the bottom wall of the main housing portion, the guide rail being configured for slidably mounting the fiber optic telecommunications module to a first telecommunications device, wherein the guide rail is configured for sliding the fiber optic telecommunications module along a direction that is non-parallel to the longitudinal axes of the adapters.

The fiber optic assembly comprises a fixture and a plurality of telecommunications modules mounted on the fixture, with each of the telecommunications modules being movably mounted on the fixture for movement along a line of travel, each one of the telecommunications modules including:

a main housing portion including a top wall, a bottom wall, a first transverse sidewall, a rear wall, an open front end and an open second side, the main housing portion including an optical component therewithin;

a cover portion coupled to the main housing portion to close up the open second side of the main housing portion and keep the optical component within the main housing portion;

a first plurality of fiber optic adapters and a second plurality of fiber optic adapters coupled to the main housing portion to close the open front end of the main housing portion, the first plurality of fiber optic adapters being stacked in a direction from the top wall toward the bottom wall, the second plurality of fiber optic adapters being stacked in a direction from the top wall toward the bottom wall, the first plurality of adapters being provided in a side-by-side arrangement with the second plurality of fiber optic adapters along a direction extending from the first transverse sidewall toward the cover portion, each of the adapters being configured to receive connectorized cables extending from the optical component within the main housing portion, and each adapter defining a longitudinal axis that is parallel to the top and bottom walls of the main housing portion;

wherein a line of travel of each telecommunications module is positioned at a non-parallel angle to the longitudinal axes of the adapters.

Preferably, the adapters are arranged in the adapter modules described previously.

The method of mounting a telecommunications module to a piece of telecommunications equipment, the telecommunications module including a body defining a top end, a bottom end, a first side, a second side, a first plurality of fiber optic adapters and a second plurality of fiber optic adapters, the first plurality of fiber optic adapters being stacked in a direction from the top end toward the bottom end of the module, the second plurality of fiber optic adapters being stacked in a direction from the top end toward the bottom end of the module, the first plurality of adapters being provided in a side-by-side arrangement with the second plurality of fiber optic adapters along a direction extending from the first side to the second side of the module, the adapters defining parallel longitudinal connector axes, the piece of telecommunications equipment including a fixture having a plurality of spaced-apart walls, opposing pairs of the walls defining a plurality of parallel spaced-apart channels and each channel being sized to receive a telecommunications module with a single plurality of adapters linearly disposed from a top end of the module to a bottom end of the module, with the longitudinal connector axes of the adapters being parallel to each other, comprises the following steps:

mounting the telecommunications module with the first and second plurality of fiber optic adapters to the fixture so as to occupy two adjacent channels defined by three spaced-apart walls without having to remove the middle wall of the three spaced-apart walls. In this case, the telecommunications module is preferably designed as described previously.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The invention is explained in greater detail hereinbelow with reference to preferred exemplary embodiments.

The figures show:

FIG. 19 a perspective view of a wall constructed for mounting the telecommunications module of FIGS. 1-11 to a piece of telecommunications equipment;

FIG. 20 a side view of the wall of FIG. 19;

FIG. 21 a cross-sectional view of the wall taken along line 21-21 of FIG. 20;

FIG. 24 a perspective view of another embodiment of a cover configured to be coupled to the main housing portion of the telecommunications module of FIG. 1;

FIG. 25 a left side view of the cover of FIG. 24;

FIG. 26 a top view of the cover of FIG. 24; and

FIG. 27 a front view of the cover of FIG. 24.

DETAILED DESCRIPTION

Figure 1:
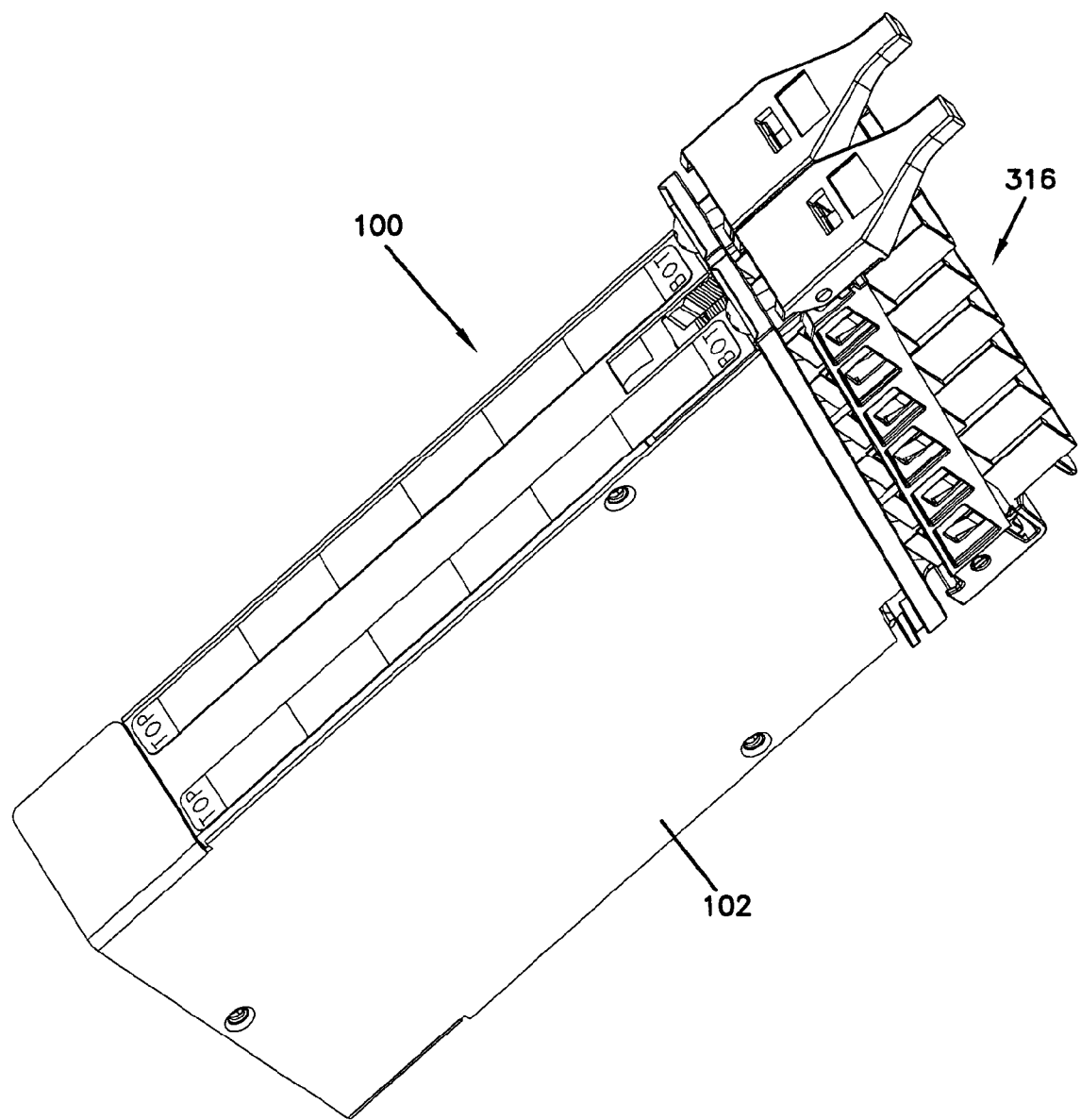
FIG. 1 a top, rear perspective view of a telecommunications module.

Reference will now be made in detail to exemplary aspects of the present disclosure which are illustrated in the accompanying drawings. Wherever possible, the same reference numbers will be used throughout the drawings to refer to the same or similar parts.

Referring now to FIGS. 1-11, a telecommunications module 100 having features that are examples of inventive aspects in accordance with the principles of the present disclosure is illustrated. The telecommunications module 100 is configured to be removably mounted to different types of telecommunications equipment for fiber optic connectivity. Some examples of telecommunications equipment that can utilize the telecommunications module are termination panels such as those illustrated and described in U.S. Pat. Nos. 7,086,539; 7,090,084; 6,870,734; 7,102,884; and 7,408,769; and U.S. Patent Application Publication No. 2009/0257726, the entire disclosures of which are incorporated herein by reference. The telecommunications modules 100 of the present disclosure can also be coupled to fixtures in the form of a chassis with a movable drawer as in U.S. Pat. No. 6,504,988 and U.S. Patent Application Publication No. 2003/0007767, the entire disclosures of which are incorporated herein by reference. The telecommunications modules 100 can also be used in telecommunications chassis, equipment, and fixtures similar to those shown in U.S. Pat. No. 6,591,051, the entire disclosure of which is incorporated herein by reference.

As will be discussed in further detail below, the telecommunications module 100 illustrated herein is configured such that one can use preexisting mounting structures found typically in the types of telecommunications equipment mentioned above for mounting the telecommunications module 100. The telecommunications module 100 is configured to be mounted to different types of telecommunications equipment using the wall structures 400 shown in FIGS. 19-21. The wall structures 400 shown in FIGS. 19-21 are also illustrated and described in detail in U.S. Pat. Nos. 6,591,051 and 7,416,349; and U.S. patent application Ser. No. 12/619,777, filed Nov. 17, 2009, the entire disclosures of which are incorporated herein by reference.

Still referring to FIGS. 1-11, the telecommunications module 100 includes a main housing portion 102 and a removable cover portion 104. The main housing 102 includes a first transverse sidewall 106 (i.e., a right sidewall) extending between a top wall 108, a bottom wall 110, and a rear wall 112. The removable cover portion 104 defines a second transverse wall 114 (i.e., left sidewall) of the telecommunications module 100 and closes off an open side 116 of the main housing portion 102. The cover 104 defines fastening holes 118 for receiving fasteners for mounting the cover 104 to the main housing portion 102.

The front end 120 of the module main housing 102 defines an open end and is configured to receive two fiber optic adapter modules 316 in a side-by-side orientation, wherein the adapter modules 316 are stacked in a direction extending generally from the right sidewall 106 toward the left sidewall 114. When mounted, the adapters 340 in each of the modules 316 are in a stacked arrangement extending from the top wall 108 to the bottom wall 110 of the main housing portion 102, wherein the longitudinal axes $A_A$ (see FIG. 6) of the adapters 340 are parallel to the top and bottom walls 108, 110 of the main housing portion 102. In the depicted embodiment, the adapter modules 316 extend at an angle from the bottom wall 110 to the top wall 108 of the main housing 102 such that the individual adapters 340 are provided in a stepped configuration. The angle defined by the adapter modules 316 is a non-perpendicular angle with respect to a direction taken from the rear wall 112 toward the front end 120 of the main housing portion 102. Further details of the adapter modules 316 will be discussed below.

Figure 11:
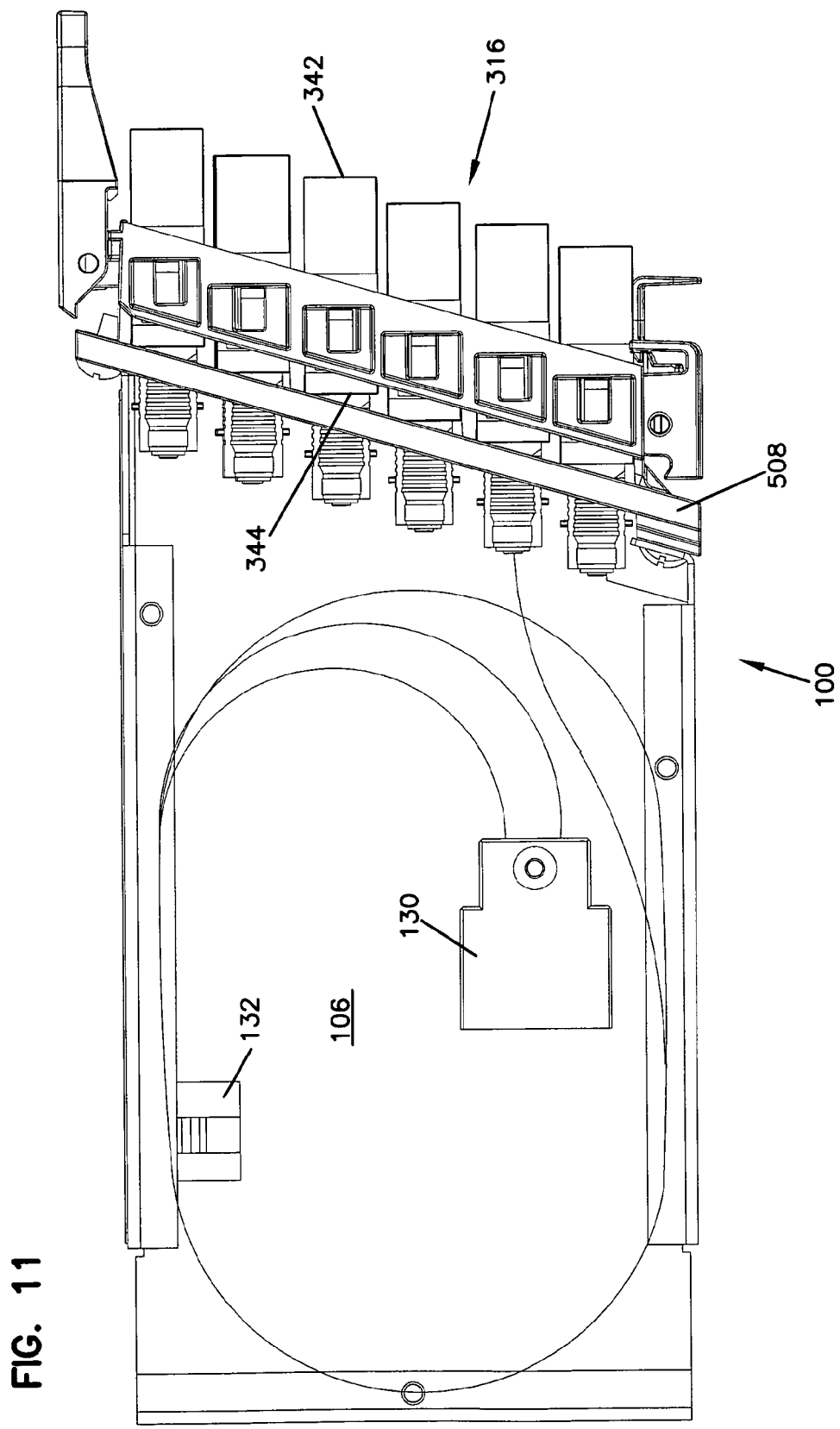
FIG. 11 the telecommunications module of FIG. 10 with all of the internal dividers removed from the module to expose the internal features thereof including an exemplary routing configuration of an optical fiber within the module.
Figure 12:
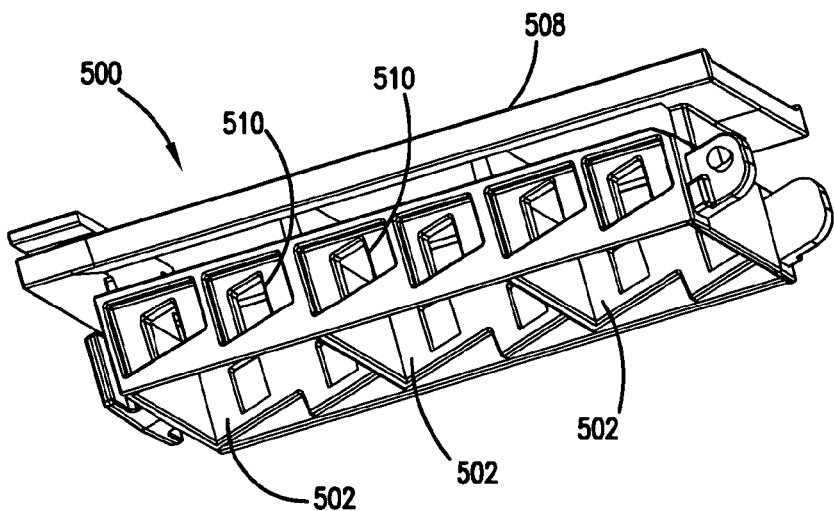
FIG. 12 a perspective view of a housing of one of the sliding adapter modules configured to be coupled to the main housing portion of the telecommunications module of FIG. 1 to form the telecommunications module of FIG. 1, the housing shown without a pivoting handle or a slide handle.
Figure 13:
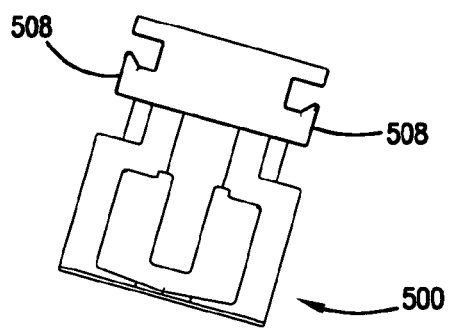
FIG. 13 a rear view of the housing of FIG. 12.
Figure 14:
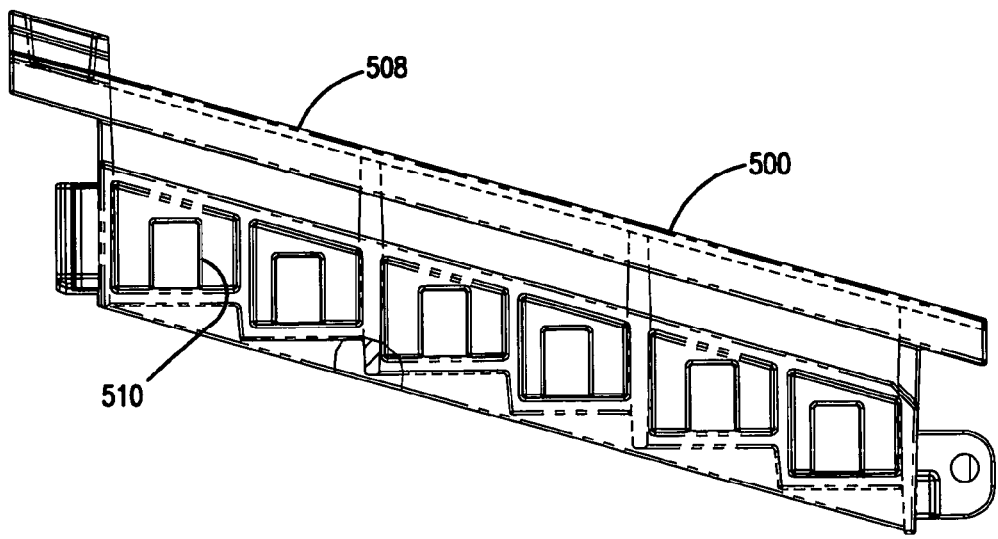
FIG. 14 a left side view of the housing of FIG. 12.

When the adapter modules 316 are mounted to the main housing portion 102, the rear ends 344 of the adapters 340 face toward the interior of the module 100 while the front ends 342 protrude away from the module 100 (see FIG. 11). Once the cover 104 is attached to the main housing portion 102, the rear ends 344 of the adapters 340 are hidden within the interior of the module 100. In the depicted embodiment, the top wall 108 of the main housing portion 102 includes a portion that is bent upwardly to define an upper fastening flange 122 at the front end 120 of the main housing portion 102 (see FIG. 6). Similarly, the bottom wall 110 of the main housing portion 102 includes a portion that is bent upwardly to define a lower fastening flange 124 at the front end 120 of the main housing portion 102. Each of the adapter modules is fastened to the main housing portion 102 with fasteners through the upper and lower fastening flanges 122, 124. In FIGS. 1, 2, and 7-11, the telecommunications module 100 is shown with the fiber optic adapter modules 316 coupled to the main housing portion 102 of the module 100. FIGS. 3-6 illustrate the telecommunications module 100 with one of the fiber optic adapter modules 316 exploded off the main housing portion 102.

Figure 5:
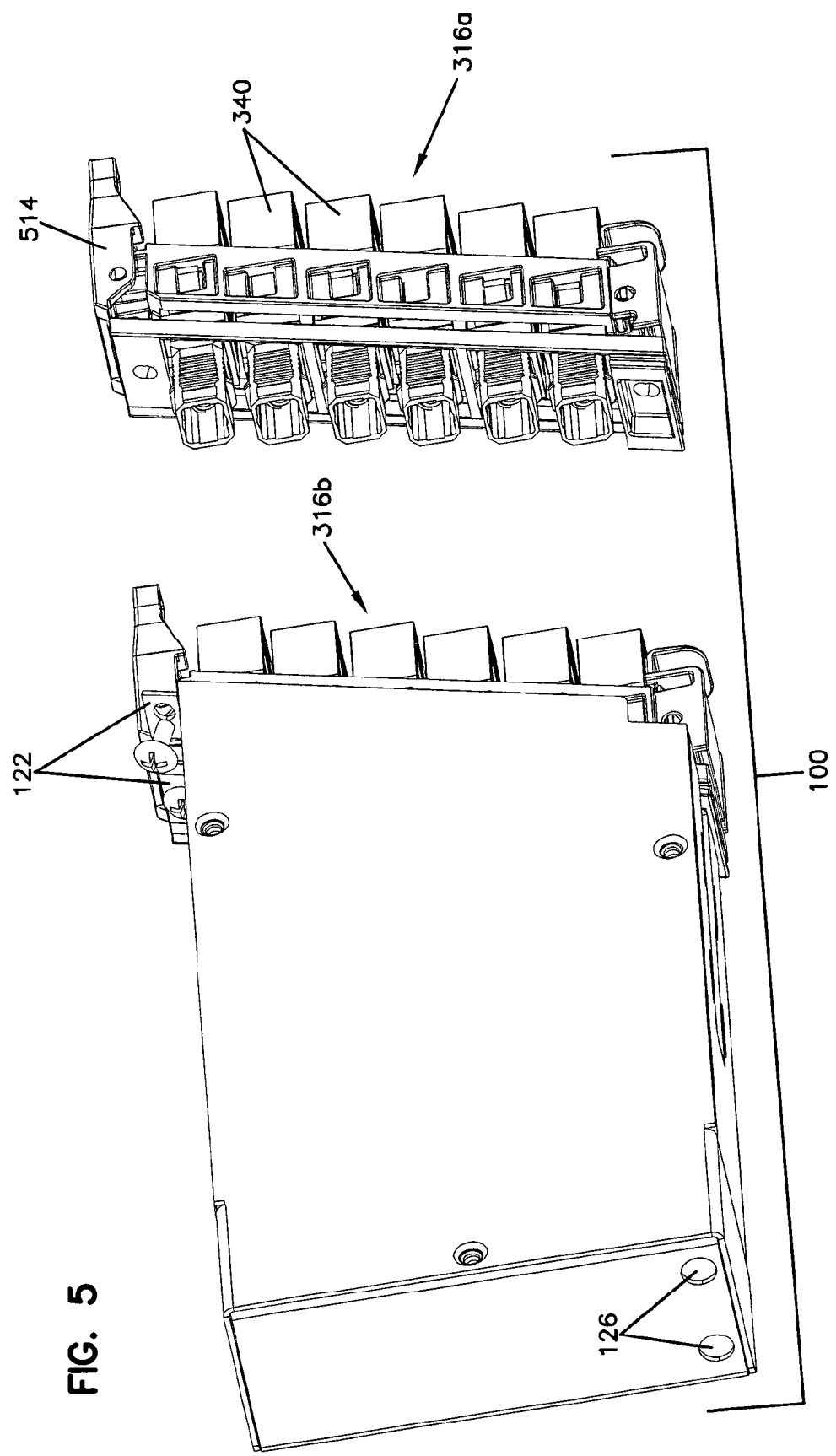
FIG. 5 another partially exploded view of the telecommunications module of FIG. 1, illustrating one of the adapter modules exploded off the main housing portion of the telecommunications module and the cover mounted on the module.
Figure 6:
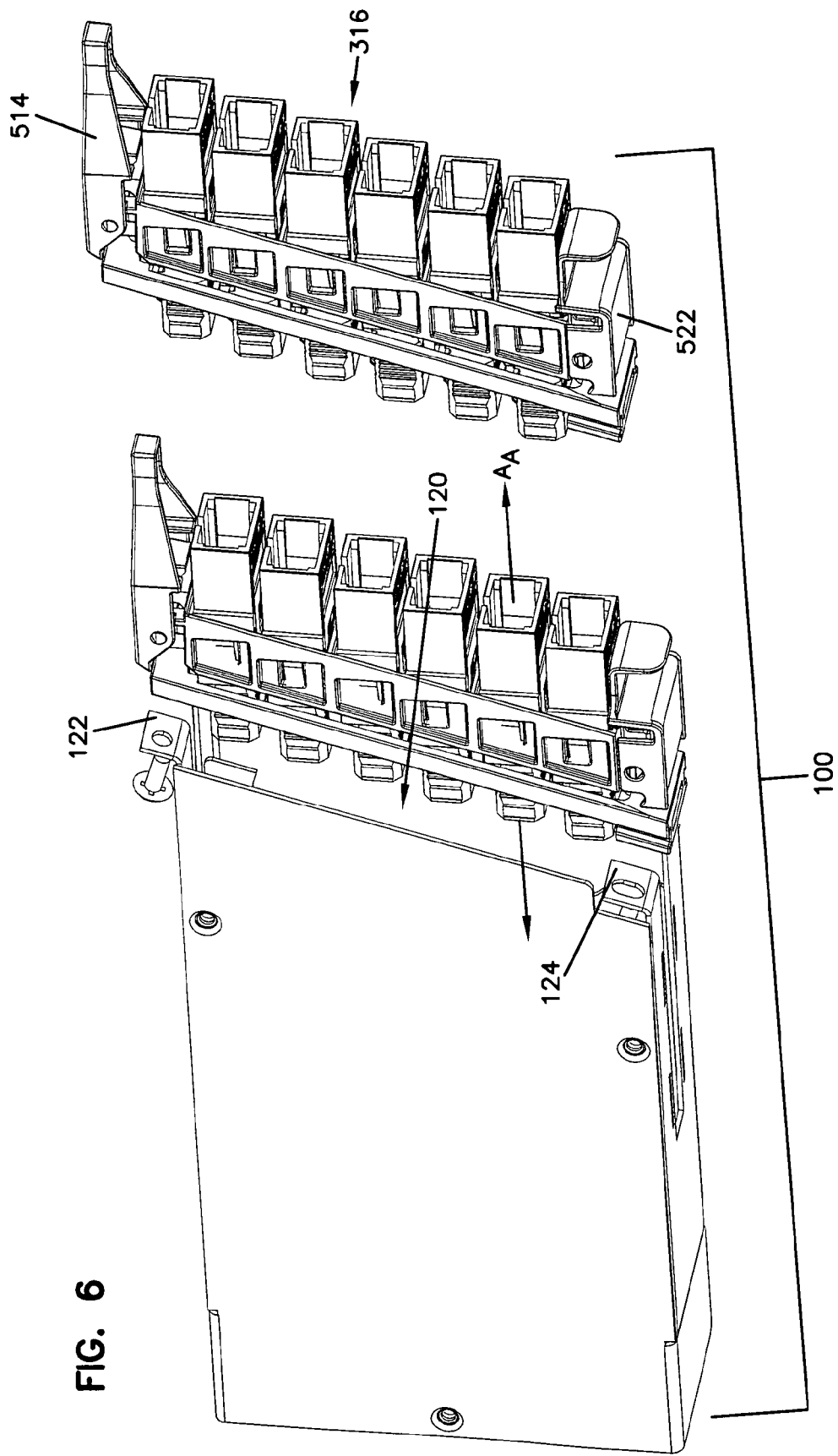
FIG. 6 another perspective view of the telecommunications module of FIG. 5.
Figure 7:
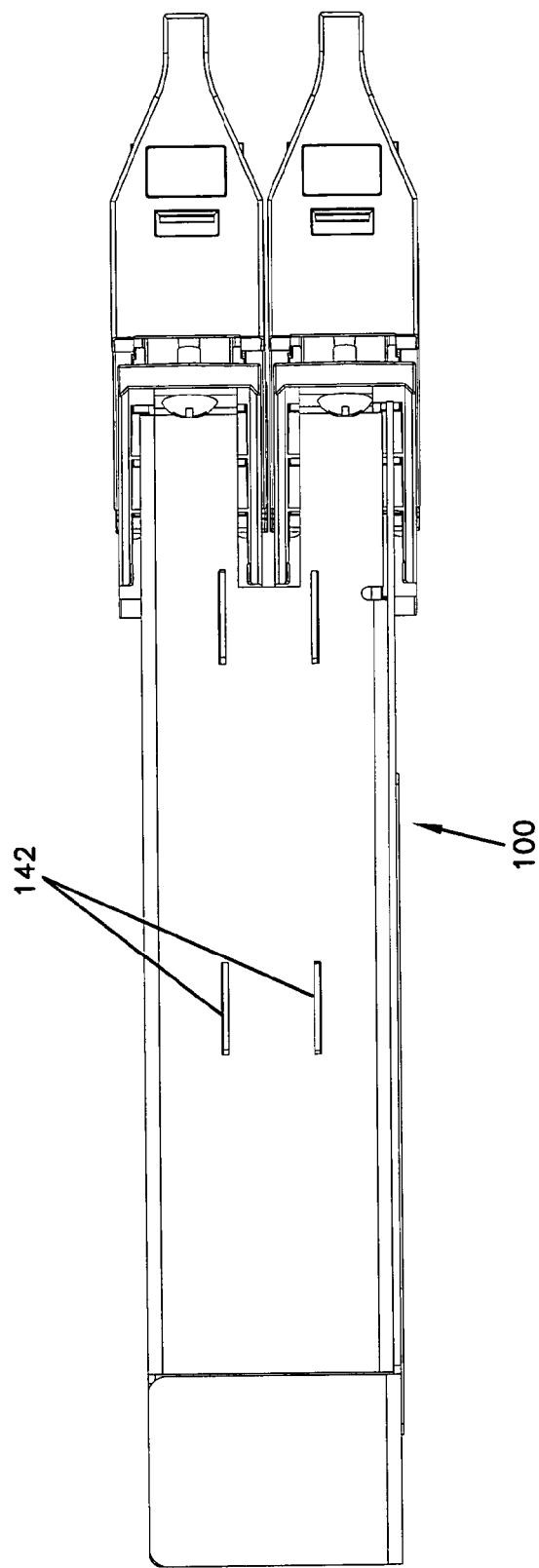
FIG. 7 a top view of the telecommunications module of FIG. 1.
Figure 8:
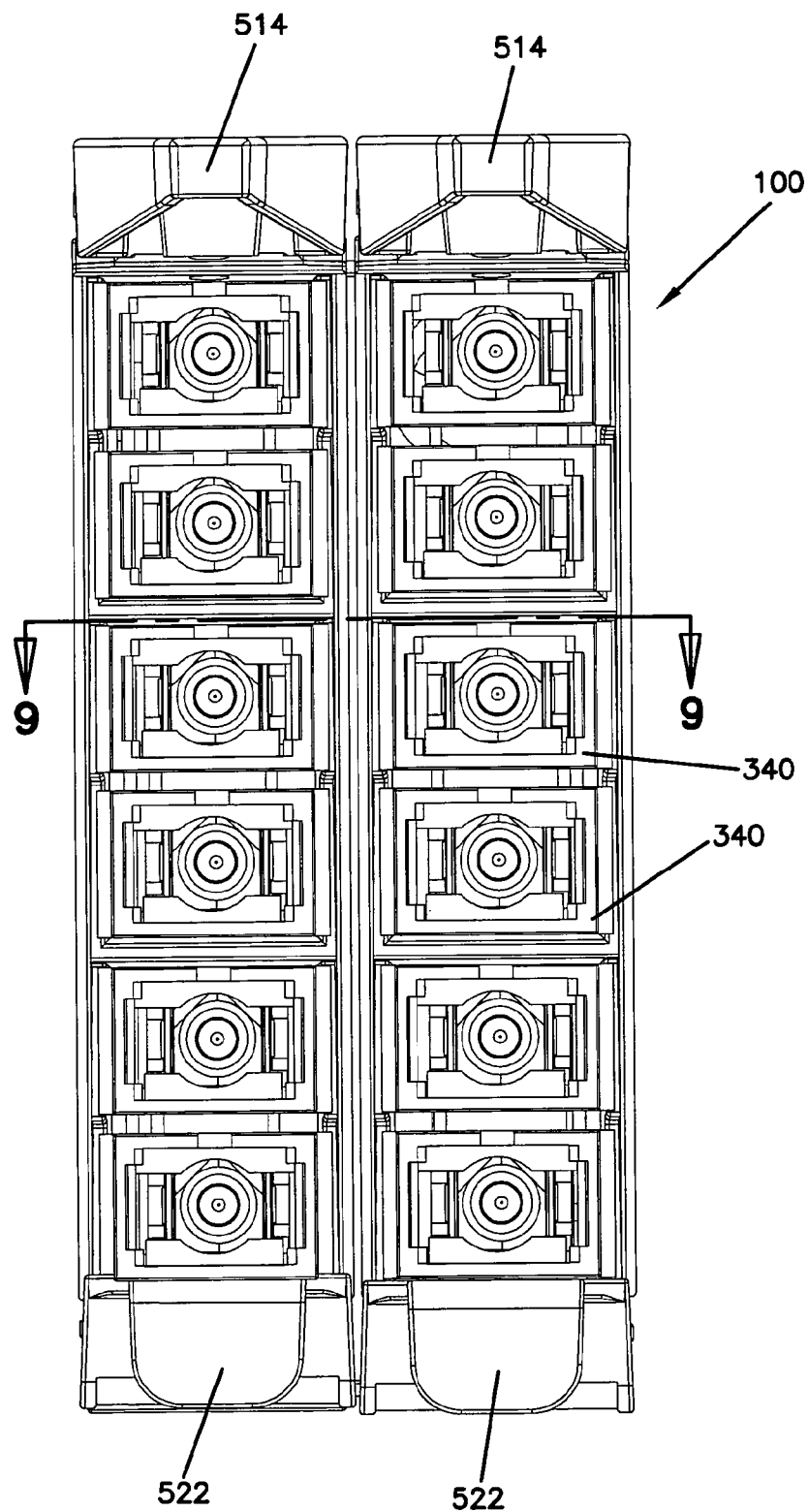
FIG. 8 a front view of the telecommunications module of FIG. 1.
Figure 9:
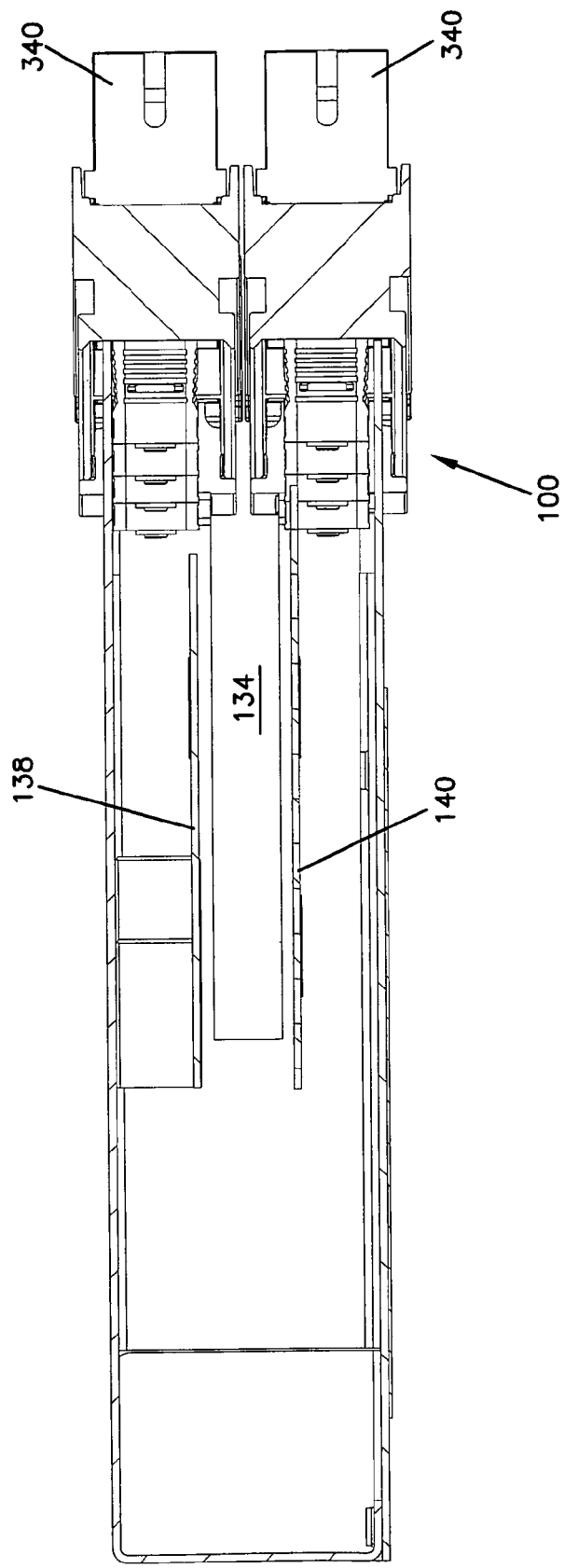
FIG. 9 a cross-sectional view of the telecommunications module of FIG. 1, taken along lines 9-9 of FIG. 8.
Figure 10:
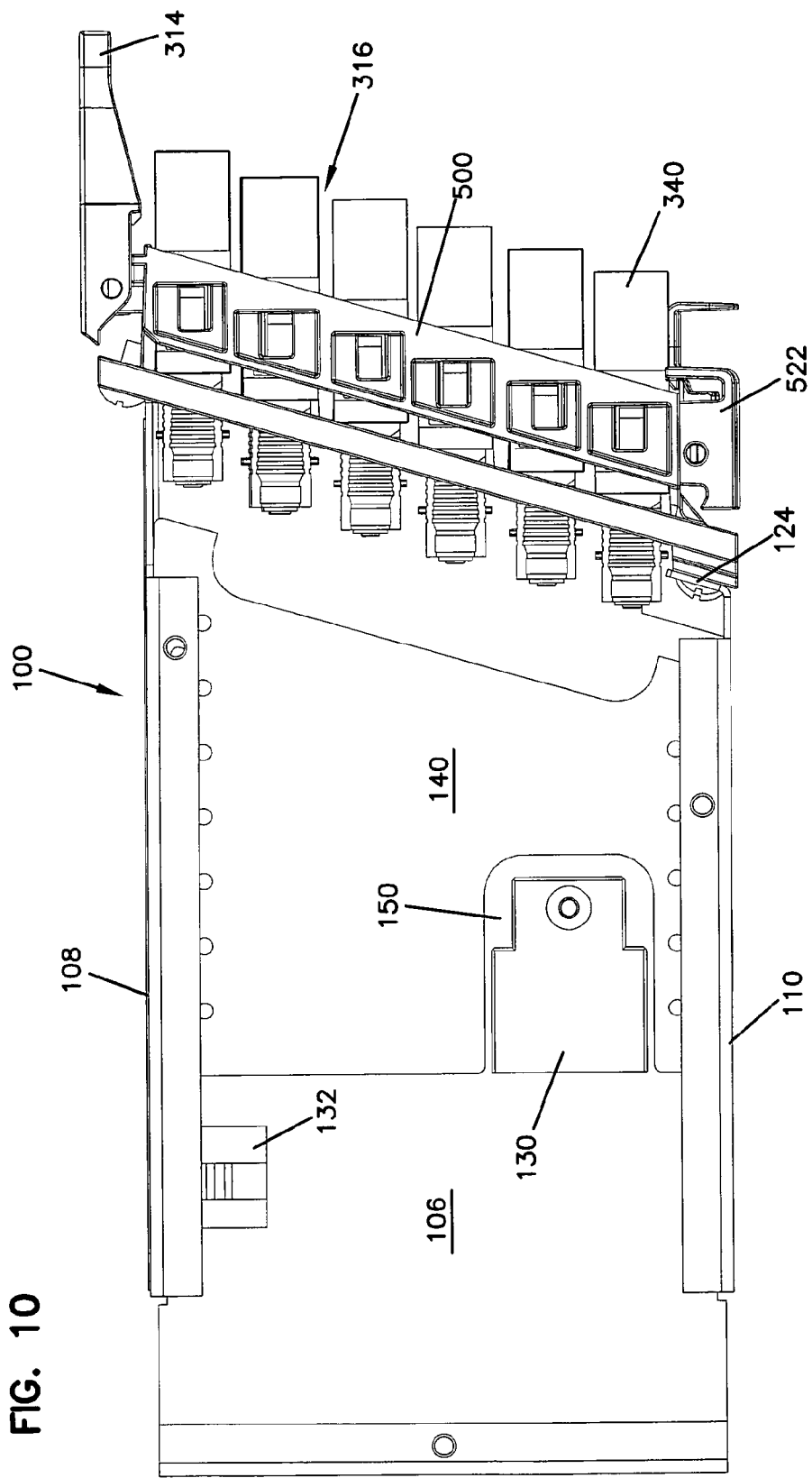
FIG. 10 a left side view of the telecommunications module of FIG. 1, the telecommunications module shown without its cover and without internal dividers for mounting within the module.

In the depicted embodiment, since the lower mounting flange 124 is hidden within the interior of the module 100 when the cover 104 is attached to the main housing portion 102, the rear wall 112 of the main housing portion 102 includes a pair of openings 126 for accommodating tools such as screwdrivers used to fasten/unfasten the adapter modules 316 to and from the lower mounting flange 124 (see, for example, FIG. 5).

The adapters 340 of the adapter modules 316 provide signal input or output locations for fiber optic signals to or from the telecommunications module 100 via use of connectorized cabling. The removable adapter modules 316 can be populated as desired based on types of optical equipment housed within the telecommunications module 100 and the connectivity desired.

Figure 2:
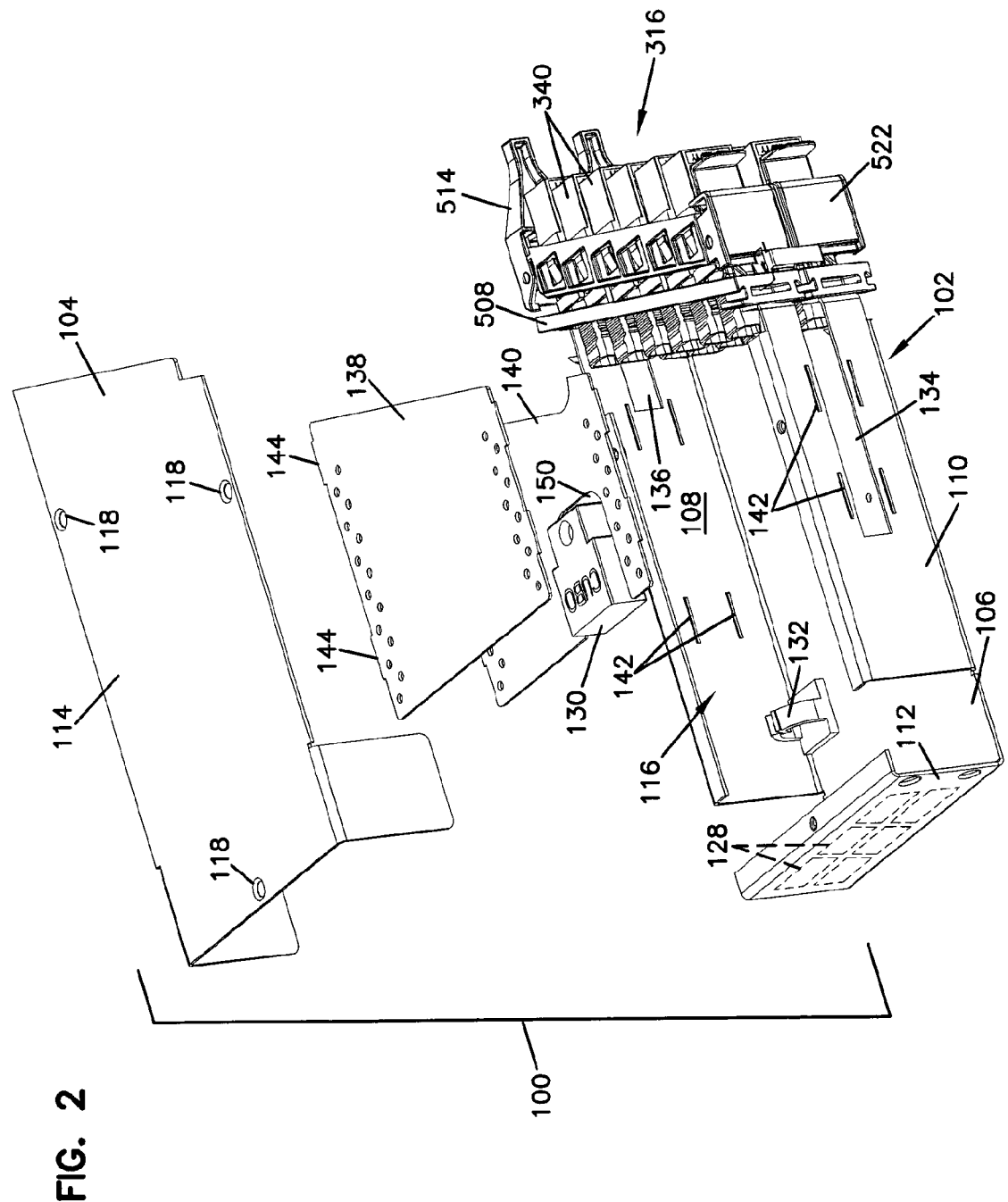
FIG. 2 a partially exploded view of the telecommunications module of FIG. 1.

It should also be noted that in other embodiments, in addition to the removable adapter modules 316, other parts of the telecommunications module 100 can be utilized for signal input or output locations. According to one example, the rear wall 112 of the main housing portion 102 can be used to provide additional signal input/output locations. For example, fiber optic adapters (such as adapters 340) may be mounted to openings provided on the rear wall 112 of the main housing portion 102, wherein such adapters would provide signal input or output locations for fiber optic signals through the use of connectorized cabling. These adapters may be fixedly or removably mounted. FIG. 2 illustrates possible adapter mounting locations 128 for additional signal input/output options.

As will be discussed in further detail below, in addition to providing signal input/output locations, the adapter modules 316 also provide a structure for slidably mounting the telecommunications modules 100 to other telecommunications equipment.

The telecommunications module 100 can be used to house a variety of different types of optical components, depending upon the desired connectivity. The embodiment of the telecommunications module 100 depicted herein is configured to house a Coarse Wavelength Division Multiplexer (CWDM) within the main housing portion 102. In the depicted embodiment, the optical component 130 is fastened to the first transverse sidewall 106 of the main housing portion 102 with a fastener. Once the optical component 130 is placed within the main housing portion 102, it is captured therein by the cover 104. FIG. 11 illustrates one exemplary routing configuration of an optical fiber within the module 100 extending between one of the adapters 340 of the adapter module 316 and the CWDM within the main housing 102.

In the depicted embodiment of the telecommunications module 100, the module 100 includes a cable management structure 132 mounted to the first transverse sidewall 106 of the main housing portion 102. The cable management structure 132 is provided in the form of a split-ring for organizing cables within the module 100.

As noted, the optical component 130 and the fiber optic circuitry illustrated and described herein is simply one of many different examples that can be implemented using the module 100 and should not be used to limit the broad inventive concepts of the telecommunications module 100 and features thereof. For example, in other embodiments, fiber optic splitters, attenuators, equalizers, other types of multiplexers/demultiplexers, etc. may be used within the module 100.

Referring now to FIGS. 12-18, one of the adapter modules 316 that are configured to be coupled to the telecommunications module 100 is illustrated. Similar adapter modules are illustrated and described in U.S. Pat. Nos. 5,497,444; 6,591,051; and 7,416,349; and U.S. patent application Ser. No. 12/619,777, filed Nov. 17, 2009, the entire disclosures of which are incorporated herein by reference.

The adapter module 316 is configured to be coupled to the main housing portion 102 of the telecommunications module 100, and, with the main housing portion 102, slide outwardly from a piece of telecommunications equipment to provide selective access to the connectors mounted therein and the optical component(s) within the module 100. In the depicted embodiment, the adapter module 316, and, thus, the telecommunications module 100 is configured to slide at a nonperpendicular angle relative to the longitudinal axes of the connectors mounted on the module 100. Thus, as noted above and as seen in FIGS. 1-18, the adapter module 316 depicted has a stepped configuration. As known, this type of a sliding arrangement helps reduce cable pull as the telecommunications module 100 is moved linearly along the walls 400 (see e.g. FIG. 19).

It should be noted that the adapter module 316, and thus, the telecommunications module 100 may be configured to slide in a direction generally perpendicular to the longitudinal axes of the connectors mounted on the module 100 if desired. The following discussion, however, will focus on the angled sliding adapter module 316, it being understood that the following description is also fully applicable to "straight" adapter modules.

Figure 17:
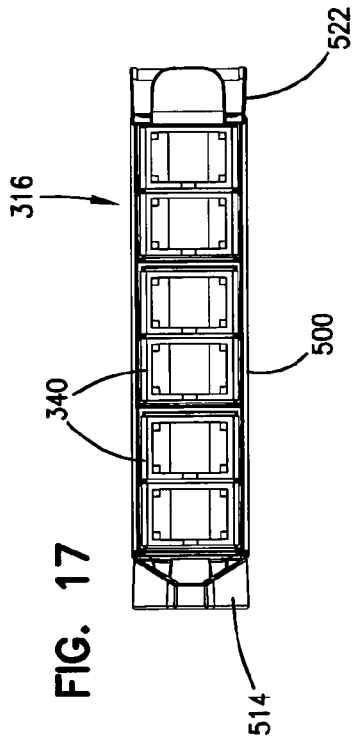
FIG. 17 a front view of a fully assembled sliding adapter module configured to be coupled to the main housing portion of the telecommunications module of FIG. 1.
Figure 15:
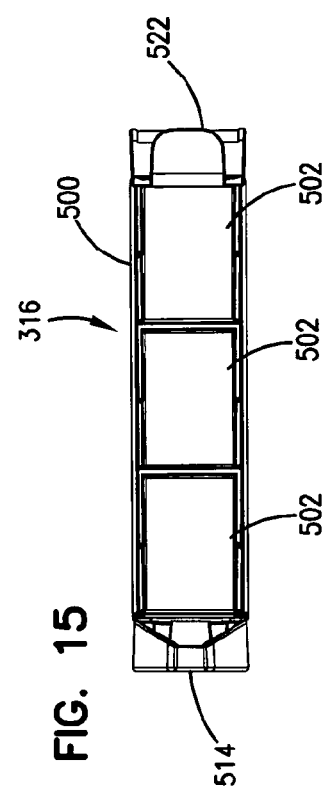
FIG. 15 a front view of the housing of FIG. 12, the housing shown with the pivoting handle at one end and the spring biased slide handle at the other end.
Figure 18:
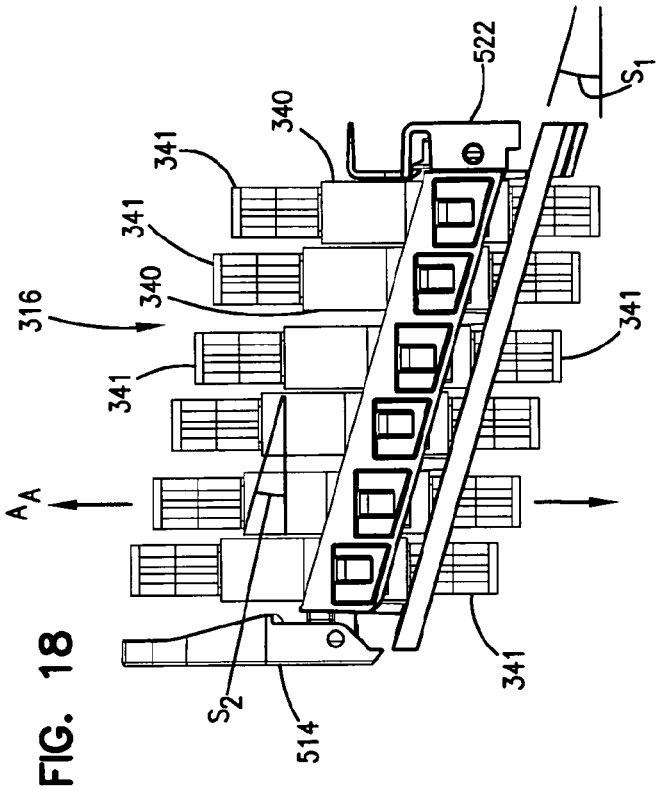
FIG. 18 a left side view of the sliding adapter module of FIG. 17.
Figure 16:
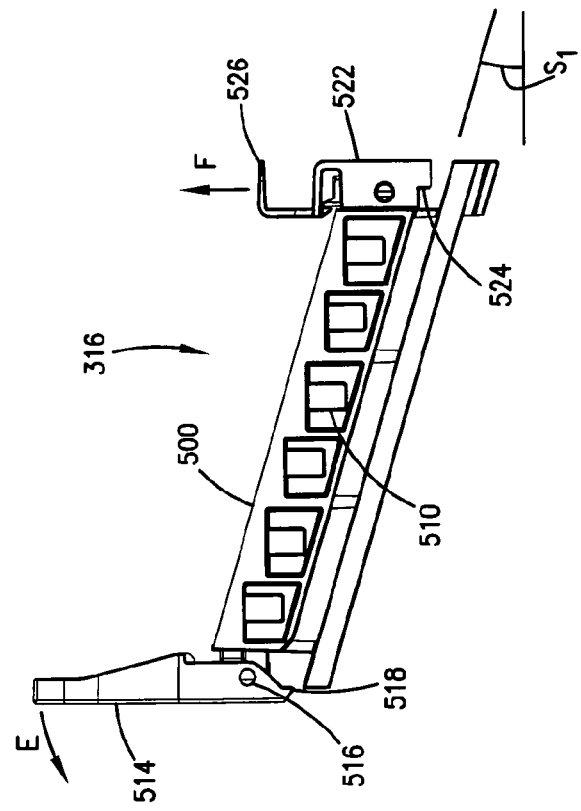
FIG. 16 a left side view of the housing of FIG. 15.

The adapter module 316 includes a module housing 500 with cooperating guides 508 formed as rails for slideably mounting the adapter module 316 and thus the telecommunications module 100 to the wall structures 400. Housing 500 includes openings 502 for receiving adapters 340. SC type are shown in FIGS. 17 and 18 as adapters 340, including dust caps 341. In the example shown, three openings 502 are sized to receive six adapters 340. The SC adapters 340 snap into side openings 510. SC type adapters, and the corresponding mating connectors are shown, for example, in U.S. Pat. No. 5,317,663, the entire disclosure of which is incorporated herein by reference. The array of adapters 340 is configured in a stacked arrangement extending from a top side of the housing 500 to the bottom side. The adapter openings define longitudinal axes that are parallel to each other.

The guide rails 508 extend at an angle from the top of the module housing 500 to the bottom of the housing 500. The slope $S_1$ of the guide rails 508 is generally equal to a slope $S_2$ formed by the array of adapters 340. In this manner, when the adapter module 316 (along with the telecommunications module 100) is slid with respect to a piece of telecommunications equipment, the longitudinal axes $A_A$ of the adapters 340 stay parallel with respect to a surface of a telecommunications equipment to which the walls 400 are mounted. The slope $S_2$ may be defined by a line connecting the same point on each of the adapters 340. For example, $S_2$ may be formed by connecting the point of intersection of the front and top of each of the adapters 340 as shown in FIG. 18.

In the example shown in FIGS. 12-18, the adapter module 316 includes six adapters 340. It will be appreciated that, depending upon the configuration of the housing 500 of the adapter module 316, other numbers are possible. It should also be noted that although the illustrated adapters 340 are configured to receive SC-type connectors, the module 316 can be designed to interconnect other types of connectors such as LC connectors. In housing adapter types that are different than SC-type adapters, parts of the telecommunications module 100 may be modified to accommodate the different types of adapters. For example, in FIGS. 24-27, a cover 104a that is configured to accommodate LC-type adapters is shown. The cover 104a is configured to be mounted to the main housing portion 102 of the telecommunications module 100 without any modifications to the main housing portion 102. The front end 111 of the cover 104a includes a stepped configuration as shown in FIGS. 24 and 25.

Referring back to FIGS. 12-18, the adapter module 316 includes a pivoting handle 514 which pivots about hinge 516 in the direction of arrow E, as shown in FIG. 16. As will be discussed in further detail below, the pivoting handle 516 is configured to engage a portion of the wall 400 to lift adapter module housing 500 so as to allow movement from a retracted position to an extended position on the wall 400. A slide handle or clip 522 is located at the opposite end of the adapter module housing 500. The slide handle 522 is normally configured to engage a portion of the wall 400 to retain the module 316 in the retracted position. The pivoting handle 514 is used to move the slide handle 522 out of engagement with the wall 400 to allow movement to the extended position through a pulling motion by the user. Once the adapter module 316 is in a fully extended position on the wall 400, the slide handle 522 engages a portion of the wall 400 to keep module 316 from sliding off of walls 400. Slide handle 522 is spring loaded to resist movement of handle portion 526 in the direction of arrow F in FIG. 16. In a fully extended position of the adapter module 316, the slide handle 522 can also be moved manually to allow module 316 to be completely separated from walls 400, such as for repair or replacement of the adapters 340.

One of the walls 400 is illustrated in closer detail in FIGS. 19-21. Each wall 400 includes a guide edge 416 which defines a first notch 424 adjacent to a first end 422 of the guide edge 416 and a second notch 426 adjacent to a second end 428 of the guide edge. The second notch 426 is defined by a tab 430 that forms a shoulder 420 within the second notch 426. Referring to the cross-sectional view of the wall 400 in FIG. 21, the wall 400 also defines a pair of linear grooves 414 on opposite sides of the wall 400. A groove 414 from one wall is configured to cooperate with an opposing groove 414 from an adjacent wall to provide a track for the sliding telecommunications module 100, as will be described in further detail below. The walls 400 also include fastener openings 413 for mounting to a surface on a piece of telecommunications equipment, such as those discussed above.

The guide rails 508 defined by the module housing 500 slidably mate with the grooves 414 of opposing walls 400. As noted above, the pivoting handle 514 of the module 316 pivots about hinge 516 in the direction of arrow E in FIG. 16. A tip 518 of the pivoting handle 514 engages tab 430 of wall 400 to lift adapter module housing 500 so as to allow movement from the retracted position to the extended position. Slide handle or clip 522 engages guide edge 416 of wall 400. Corner 524 defined by the slide handle 522 engages first notch 424 to retain module 316 in the retracted position. The pivoting handle 514 moves corner 524 out of first notch 424 to allow movement of the module 316 to the extended position through a pulling motion by the user. Corner 524 falls into second notch 426 in the fully extended position to keep module 316 from sliding off of walls 400. Slide handle 522 is spring loaded to resist movement of handle portion 526 in the direction of arrow F shown in FIG. 16. If needed, slide handle 522 can be moved manually to allow module 316 (and the telecommunications module 100) to be completely separated from walls 400, such as for repair or replacement of the adapters 340.

It should be noted that in an embodiment of a telecommunications module 100 such as the one shown in FIGS. 1-11, wherein two adapter modules 316 are provided in side-by-side configuration, the pivoting handles 514 of each of the adapter modules 316 could be integrated and provided as a single handle. According to one embodiment, the handles could be manufactured as a single handle that is formed from an integral version of the two handles 514 combined together. The single handle would include structure for coupling with the hinges 516 on the exterior sides of the adapter module housings 500.

In another embodiment, the two pivoting handles 514 could be fixed with respect to each other such that pivoting one would pivot the other at the same time. In this manner, the telecommunications module 100 could be lifted to allow for movement by pivoting only a single handle, rather than pivoting both handles 514 individually.

The wall structures 400 shown in FIGS. 19-21 are normally arranged and spaced in telecommunications equipment for receiving a single slidable adapter module 316 between two of the walls 400. Since the walls 400 are configured such that one wall 400 can receive a sliding module 316 on each side, for example, a total of fourteen walls 400 would be required to support thirteen single modules 316.

Although the telecommunications module 100 includes two sliding adapter modules 316 mounted in a stacked, side-by-side arrangement at the end of the module 100, the telecommunications module 100 is configured such that it can utilize the existing wall structures 400 that are adapted for single sliding adapter modules 316 without any modification to the existing wall structures 400. As such, the telecommunications module 100 is able to provide a larger footprint housing and is able to centralize a larger number of optical connections around a single optical component within that housing, without sacrificing density or access and without the need for modification of preexisting mounting structures.

Figure 22:
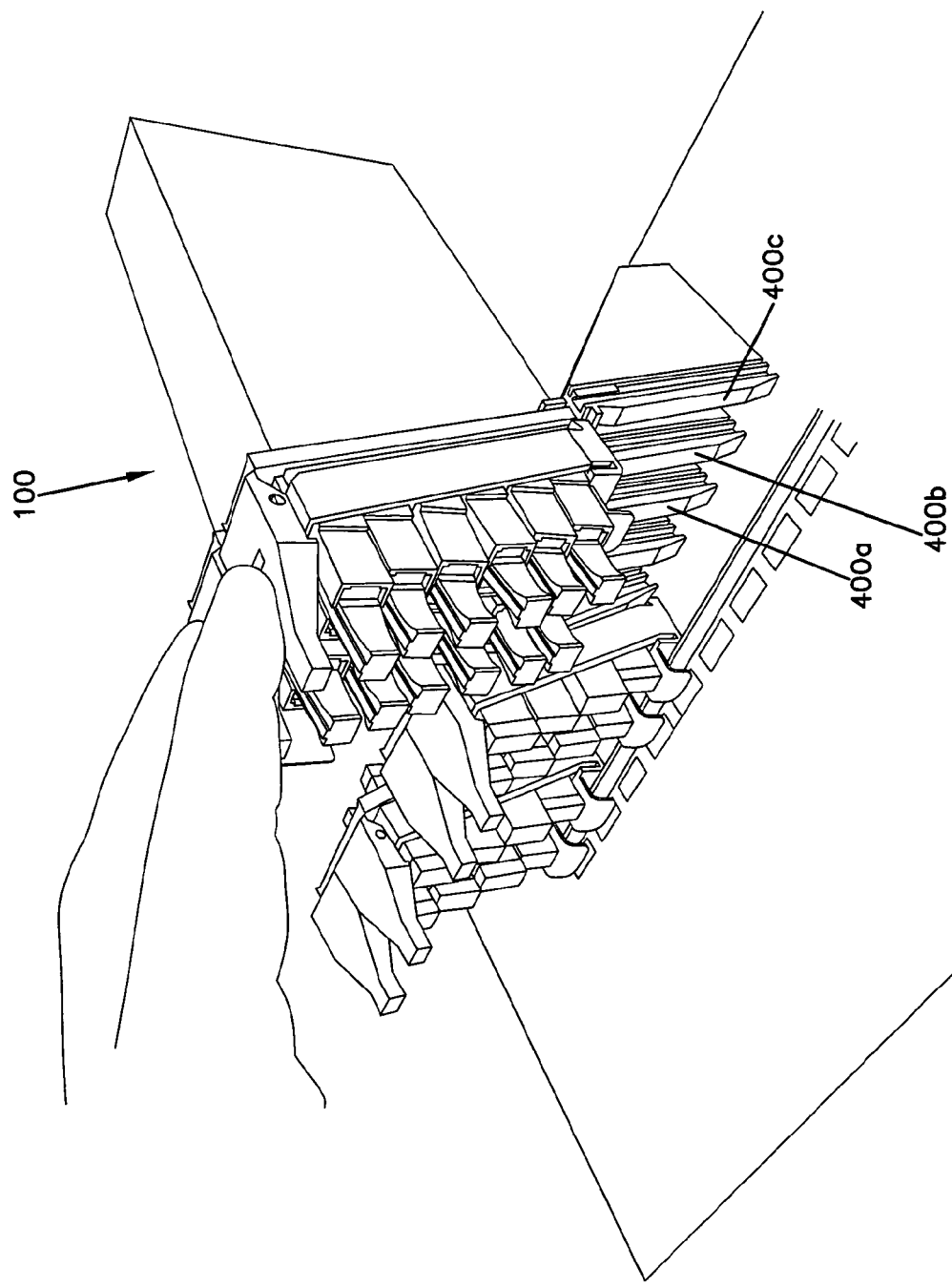
FIG. 22 the telecommunications module of FIGS. 1-11 being installed on a piece of telecommunications equipment using the walls illustrated in FIGS. 19-21.
Figure 23:
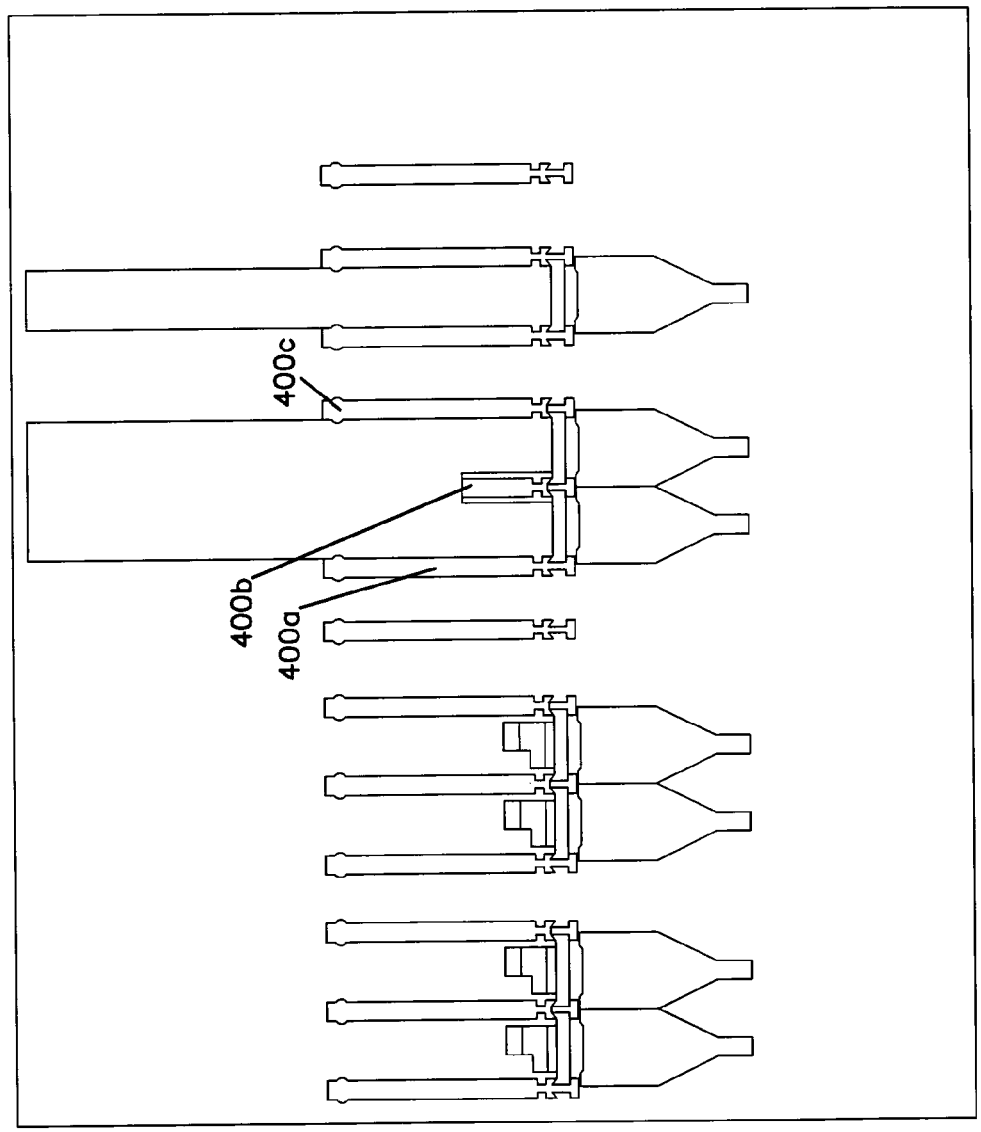
FIG. 23 the telecommunications module of FIGS. 1-11 slid along the walls illustrated in FIGS. 19-21.

Now referring back to FIGS. 1-11, the main housing portion 102 of the telecommunications module 100 includes structure for allowing the telecommunications module 100 to be mounted between two (non-adjacent) wall structures 400a, 400c, without having to remove the third wall structure 400b that is positioned between the two wall structures 400a, 400c (please see FIGS. 22 and 23). As such, the telecommunications module 100 not only preserves density, but also allows retrofitting of the modules 100 onto equipment without any modification to preexisting mounting fixtures on telecommunications equipment.

As shown in FIG. 2, the main housing portion 102 of the telecommunications module 100 defines a first large slot 134 at the bottom wall 110 and a second smaller slot 136 at the top wall 108. When the telecommunications module 100 is mounted to wall structures 400a, 400c (as shown in FIGS. 22 and 23), the first and second slots 134, 136 accommodate a third wall structure 400b that is in between the two wall structures 400a, 400c used for mounting the telecommunications module 100. Since the wall structures 400 have a triangular shape extending from a large width at the bottom to a point at the top (see FIG. 22), when the telecommunications module 100 is mounted to the walls 400, the slot 134 at the bottom wall 110 is large enough to accommodate the bottom width of the triangular wall structure 400.

FIG. 22 illustrates the telecommunications module 100 being installed on a piece of telecommunications equipment using the walls 400. FIG. 23 illustrates the telecommunications module 100 slid along the walls 400, with the middle wall 400b going through the main housing portion 102 of the module 100.

Figure 3:
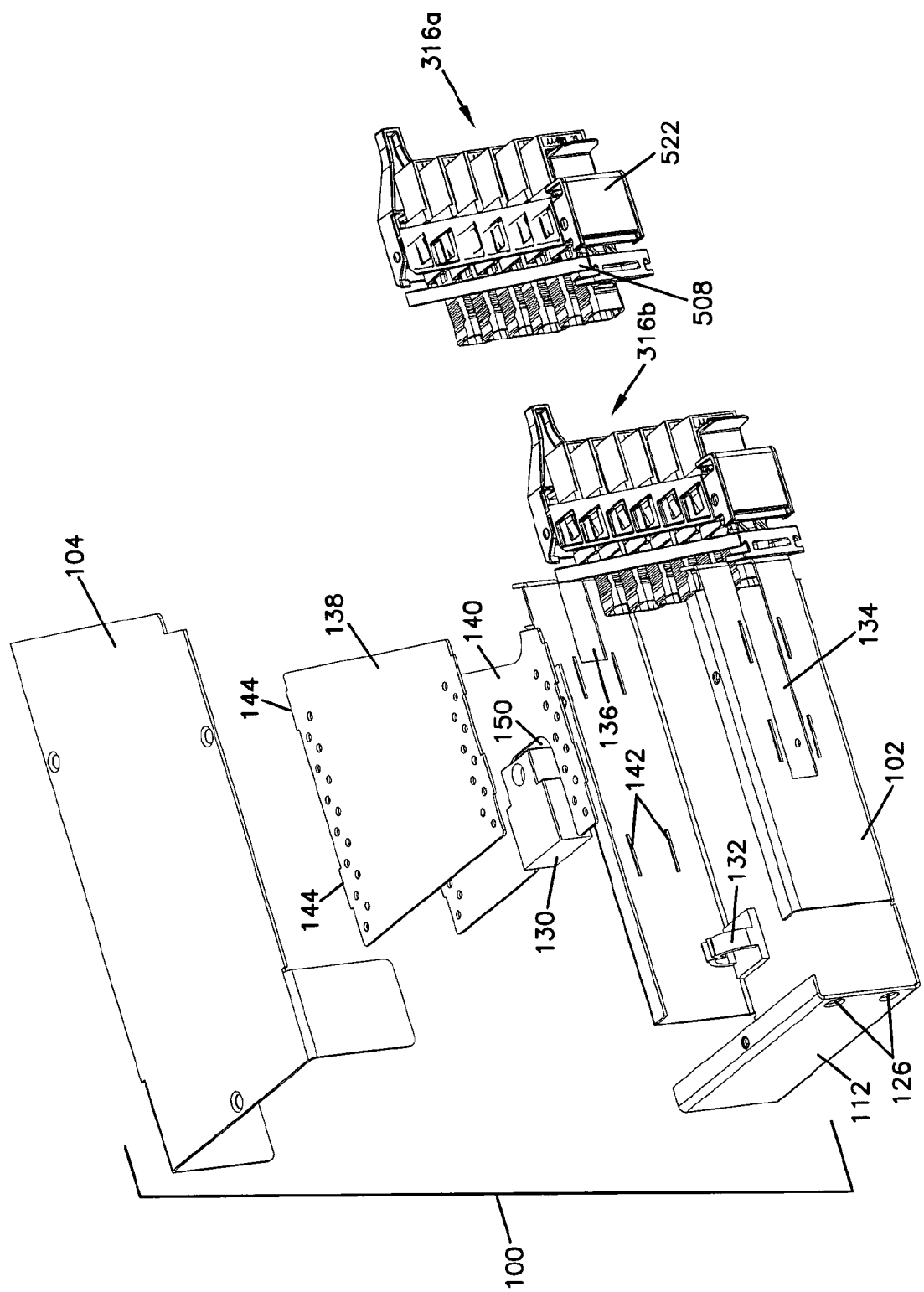
FIG. 3 another partially exploded view of the telecommunications module of FIG. 1, illustrating one of the adapter modules exploded off the main housing portion of the telecommunications module.
Figure 4:
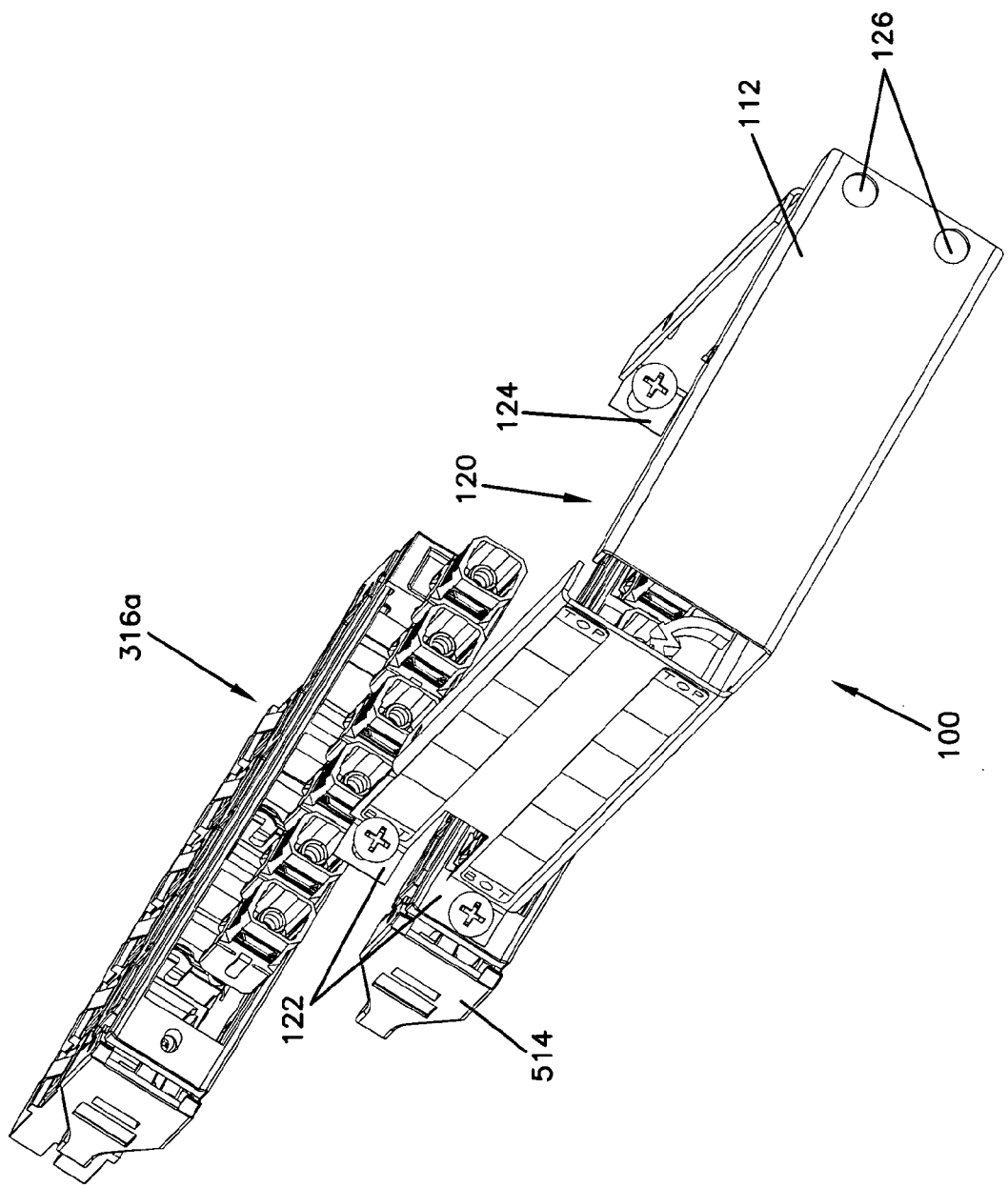
FIG. 4 another perspective view of the telecommunications module of FIG. 3, shown without the cover of the module.

Referring to FIGS. 1 and 3, the telecommunications module 100 includes a pair of dividers 138, 140 within the module 100 to keep fiber optic cables away from the third wall structure 400b that passes through the main housing portion 102 when the module 100 is mounted on the wall structures. In the embodiment depicted, each of the dividers 138, 140 are provided as planar structures. The dividers 138, 140 are removably mounted to the main housing portion 102. Each of the top and bottom walls 108, 110 of the main housing portion 102 includes slits 142 for receiving tabs 144 of the dividers 138, 140 for snap-fitting the dividers 138, 140 to the main housing portion 102. The first divider 138 is positioned to the left side of the slots 134, 136 and keeps cables from the left adapter module 316a out of the way of the wall structure 400b passing through the main housing portion 102. The second divider 140 is positioned to the right side of the slots 134, 136 and keeps cables from the right adapter module 316b out of the way of the wall structure 400b passing through the main housing portion 102. In this manner, during slidable movement of the telecommunications module 100, damage to the fiber optic cables within the main housing portion 102 may be limited or prevented.

As shown, the second divider 140 includes a cut-out 150 for accommodating the CWDM optical component 130 mounted to the right sidewall 106 of the main housing portion 102. Depending upon the type of optical component 130 used within the module 100, the cut-out 150 may or may not be used. For example, if the optical component 130 used was thin enough to fit between the second divider 140 and the right sidewall 106 of the main housing portion 102, a cut-out 150 would not be needed.

Since the telecommunications module 100 of the present disclosure is able to utilize existing wall structures 400 without any modification, depending upon the telecommunications assembly required, a user could choose between modules with single sets of adapters and modules with two sets of adapters to populate the mounting fixtures of telecommunications equipment. In certain applications, a combination of "single" and "double" telecommunications modules could be used.

Although in the foregoing description, terms such as "top", "bottom", "front", "back", "lower", "upper", "right" and "left" were used for ease of description and illustration, no restriction is intended by such use of the terms. The telecommunications devices described herein can be used in any orientation, depending upon the desired application.

The above specification, examples and data provide a complete description of the manufacture and use of the inventive aspects of the disclosure. Since many embodiments of the disclosure can be made without departing from the spirit and scope of the inventive aspects of the disclosure, the inventive aspects reside in the claims hereinafter appended.

LIST OF REFERENCE SYMBOLS

100 Telecommunications module
102 Main housing portion
104 Cover portion
104a Cover
106 Right sidewall
108 Top wall
110 Bottom wall
111 Front end
112 Rear wall
114 Left sidewall
118 Fastening holes
120 Front end
122 Upper fastening flange
124 Lower fastening flange
130 Optical component
132 Cable management structure
134 Large slot
136 Small slot
138 Divider
140 Divider
144 Tabs
150 Cut-out
316 Adapter module
316a Left adapter module
316b Right adapter module
340 Adapter 341 Dust caps
342 Front end
344 Rear end
400a-c Wall structures
413 Fastener opening
414 Grooves
416 Guide edge
420 Shoulder
422 First end
424 First notch
426 Second notch
428 Second end
430 Tab
500 Housing
502 Opening
508 Guide
510 Side opening
514 Pivoting handle
516 Hinge
522 Slide handle
524 Corner
526 Handle portion
$A_A$ Longitudinal axis
$S_1$ Slope
$S_2$ Slope

The invention claimed is:

1. A fiber optic telecommunications module comprising:
a main housing portion including a top wall, a bottom wall, a first transverse sidewall, a rear wall, an open front end, and an open second side, the main housing portion including an optical component;
a cover portion coupled to the main housing portion to close up the open second side of the main housing portion and keep the optical component within the main housing portion;
a first fiber optic adapter module and a second fiber optic adapter module removably coupled to the main housing portion to close the open front end of the main housing portion, the first and second fiber optic adapter modules being provided in a stacked arrangement in a direction extending from the first transverse sidewall toward the cover portion;
wherein each of the first and second fiber optic adapter modules includes a plurality of fiber optic adapters which are configured to receive connectorized cables extending from the optical component within the main housing portion, each adapter defining a longitudinal axis that is parallel to the top and bottom walls of the main housing portion, each of the first and second fiber optic adapter modules including at least one guide rail extending between the top wall and the bottom wall of the main housing portion, the guide rail being configured for slidably mounting the fiber optic telecommunications module to a first telecommunications device, wherein the guide rail is configured for sliding the fiber optic telecommunications module along a direction that is non-parallel to the longitudinal axes of the adapters.

2. A fiber optic telecommunications module according to claim 1, wherein the at least one guide rail of each fiber optic adapter module includes a pair of parallel guide rails.

3. A fiber optic telecommunications module according to claim 1, wherein the at least one guide rail extends in a non-perpendicular direction with respect to the longitudinal axes of the adapters.

4. A fiber optic telecommunications module according to claim 1, wherein each of the first and second fiber optic adapter modules includes six fiber optic adapters.

5. A fiber optic telecommunications module according to claim 1, wherein the fiber optic adapters are configured for interconnecting SC-type fiber optic connectors.

6. A fiber optic telecommunications module according to claim 1, wherein each of the first and second fiber optic adapter modules defines a stepped configuration extending from the top wall toward the bottom wall, wherein each of the fiber optic adapters are offset to one another in a direction along the longitudinal axes.

7. A fiber optic telecommunications module according to claim 1, wherein the optical component is a wavelength division multiplexer.

8. A fiber optic telecommunications module according to claim 1, further including at least one cable management structure within the main housing portion for managing cables extending between the optical component and the fiber optic adapters within the main housing portion.

9. A fiber optic telecommunications module according to claim 8, wherein the at least one cable management structure includes a first planar element configured to keep cables adjacent to either the first transverse sidewall or the cover.

10. A fiber optic telecommunications module according to claim 9, wherein the at least one cable management structure includes the first planar element and a second planar element that is parallel to the first planar element, wherein the first planar element is configured to keep cables adjacent to the first transverse sidewall and the second planar element is configured to keep cables adjacent to the cover.

11. A fiber optic telecommunications module according to claim 10, wherein the first and second planar elements are oriented generally perpendicularly to the top and bottom walls and the top and bottom walls and the first and second planar elements include intermating snap fit structures for snap fitting the first and second planar elements to the main housing portion.

12. A fiber optic assembly comprising:
a fixture; and
a plurality of telecommunications modules mounted on the fixture, with each of the telecommunications modules being movably mounted on the fixture for movement along a line of travel, each one of the telecommunications modules including:
a main housing portion including a top wall, a bottom wall, a first transverse sidewall, a rear wall, an open front end, and an open second side, the main housing portion including an optical component therewithin;
a cover portion coupled to the main housing portion to close up the open second side of the main housing portion and keep the optical component within the main housing portion;
a first plurality of fiber optic adapters and a second plurality of fiber optic adapters coupled to the main housing portion to close the open front end of the main housing portion, the first plurality of fiber optic adapters being stacked in a direction from the top wall toward the bottom wall, the second plurality of fiber optic adapters being stacked in a direction from the top wall toward the bottom wall, the first plurality of adapters being provided in a side-by-side arrangement with the second plurality of fiber optic adapters along a direction extending from the first transverse sidewall toward the cover portion, each of the adapters being configured to receive connectorized cables extending from the optical component within the main housing portion, and each adapter defining a longitudinal axis that is parallel to the top and bottom walls of the main housing portion;

wherein the line of travel of each telecommunications module is positioned at a non-parallel angle to the longitudinal axes of the adapters.

13. A fiber optic assembly according to claim 12, wherein the fixture defines a plurality of spaced-apart walls, opposing pairs of the walls defining a plurality of channels, wherein each telecommunications module occupies two adjacent channels defined by three spaced-apart walls, one of the spaced-apart walls extending through at least a portion of the main housing portion of the telecommunications module.

14. A fiber optic assembly according to claim 13, further comprising cooperating guides on each of the modules and the walls accommodating movement of each of the telecommunications modules along the line of travel.

15. A fiber optic assembly according to claim 12, further comprising a releasable lock for locking each telecommunications module to the fixture in a first position, each of the locks being releasable to allow movement of each of the telecommunications modules to a second position along the line of travel.

16. A fiber optic assembly according to claim 12, wherein the adapters of each of the first plurality and the second plurality define a stepped configuration extending from the top wall toward the bottom wall, wherein each of the fiber optic adapters are offset to one another in a direction along the longitudinal axes.

17. A method of mounting a telecommunications module to a piece of telecommunications equipment, the telecommunications module including a body that houses an optical component therein, the body defining a top end, a bottom end, a first side, a second side, a first plurality of fiber optic adapters, and a second plurality of fiber optic adapters, wherein the first and second plurality of fiber optic adapters are configured to receive connectorized cables extending from the optical component, the first plurality of fiber optic adapters being stacked in a direction from the top end toward the bottom end of the module, the second plurality of fiber optic adapters being stacked in a direction from the top end toward the bottom end of the module, the first plurality of adapters being provided in a side-by-side arrangement with the second plurality of fiber optic adapters along a direction extending from the first side to the second side of the module, the adapters defining parallel longitudinal connector axes, the piece of telecommunications equipment including a fixture having a plurality of spaced-apart walls, opposing pairs of the walls defining a plurality of parallel spaced-apart channels, wherein each channel is sized to receive a telecommunications module with a single plurality of adapters linearly disposed from a top end of the module to a bottom end of the module with the longitudinal connector axes of the adapters being parallel to each other, the method comprising the following steps:

mounting the telecommunications module with the first and second plurality of fiber optic adapters to the fixture so as to occupy two adjacent channels defined by three spaced-apart walls without having to remove the middle wall of the three spaced-apart walls.

\* \* \* \* \*